United States Patent
Zhang et al.

(10) Patent No.: US 7,013,818 B2
(45) Date of Patent: Mar. 21, 2006

(54) WRINKLE FREE GARMENT AND METHOD OF MANUFACTURE

(75) Inventors: Yugao Zhang, North Delta (CA); Tian-Xi Li, Gaoming (CN); Bai-Shun Chen, Gaoming (CN)

(73) Assignee: Guangdong Esquel Textiles Co. Ltd., Gaoming (CN)

( * ) Notice: Subject to any disclaimer, the term of this patent is extended or adjusted under 35 U.S.C. 154(b) by 435 days.

(21) Appl. No.: 10/073,445

(22) Filed: Feb. 11, 2002

(65) Prior Publication Data
US 2003/0075258 A1    Apr. 24, 2003

(30) Foreign Application Priority Data
Oct. 18, 2001   (CN)  ............... 01129786 A

(51) Int. Cl.
   *D05B 1/18*    (2006.01)
   *A41D 27/24*    (2006.01)
(52) U.S. Cl. ............... 112/475.09; 112/441; 2/275; 156/93
(58) Field of Classification Search ........... 112/475.09, 112/475.06, 475.14, 441, 475.08, 406, 423, 112/426; 2/247, 275; 156/93
See application file for complete search history.

(56) References Cited

U.S. PATENT DOCUMENTS

| | | | |
|---|---|---|---|
| 2,264,224 A | | 11/1941 | Swan |
| 2,266,953 A | | 12/1941 | Blue |
| 3,399,642 A | | 9/1968 | Etchison et al. |
| 4,093,675 A | * | 6/1978 | Schure et al. ............... 525/437 |
| 4,214,319 A | * | 7/1980 | Bollag .......................... 2/108 |
| 4,365,355 A | * | 12/1982 | Off et al. ....................... 2/247 |
| 4,659,615 A | * | 4/1987 | Ishii et al. .................. 428/220 |
| 5,003,902 A | | 4/1991 | Benstock et al. |

(Continued)

FOREIGN PATENT DOCUMENTS

DE         1104802         4/1961

OTHER PUBLICATIONS

Stitches and seams, *British Standard* 3870, Part 2, ISO 4916, 1991.

Primary Examiner—Ismael Izaguirre
(74) Attorney, Agent, or Firm—Jenkens & Gilchrist, P.C.

(57) ABSTRACT

A method of manufacturing wrinkle-free garment seams and garments made therefrom comprises (a) placing a bonding element comprising a thermal adhesive between garment components; (b) stitching along a seam line; and (c) applying heat and/or pressure to cause the adhesive to melt and flow along the seam to bond at least one garment component. The thermal adhesive has a melting point of higher than about 150° C., preferably in the range about 160° C. to about 190° C. Alternatively, a bonding element comprising any adhesive material and having a substantially U shape is used to make various seams, such as a yoke seam, a shoulder seam, a side seam, a pocket seam, a hem button stay seam, a sleeve seam, a collar seam, etc. Wrinkle free garments, such as shirts, pants, blouses, skirts, etc., incorporating the seams are produced.

22 Claims, 28 Drawing Sheets

U.S. PATENT DOCUMENTS

| | | | |
|---|---|---|---|
| 5,162,149 A * | 11/1992 | Reaney | 428/315.5 |
| 5,568,779 A | 10/1996 | Wong | |
| 5,590,615 A | 1/1997 | Wong | |
| 5,713,292 A | 2/1998 | Wong | |
| 5,775,394 A | 7/1998 | Wong | |
| 5,782,191 A | 7/1998 | Wong | |
| 5,950,554 A | 9/1999 | Wong | |
| 6,070,542 A | 6/2000 | Wong | |
| 6,079,343 A | 6/2000 | Wong | |
| 6,797,352 B1 * | 9/2004 | Fowler | 428/57 |

* cited by examiner

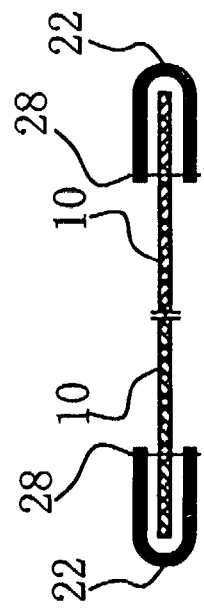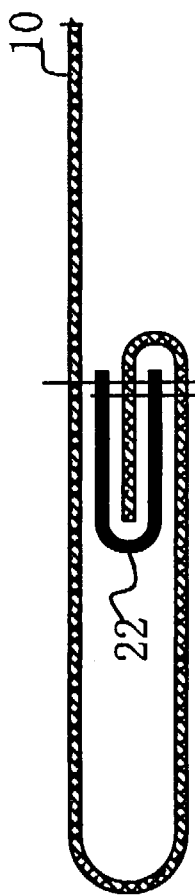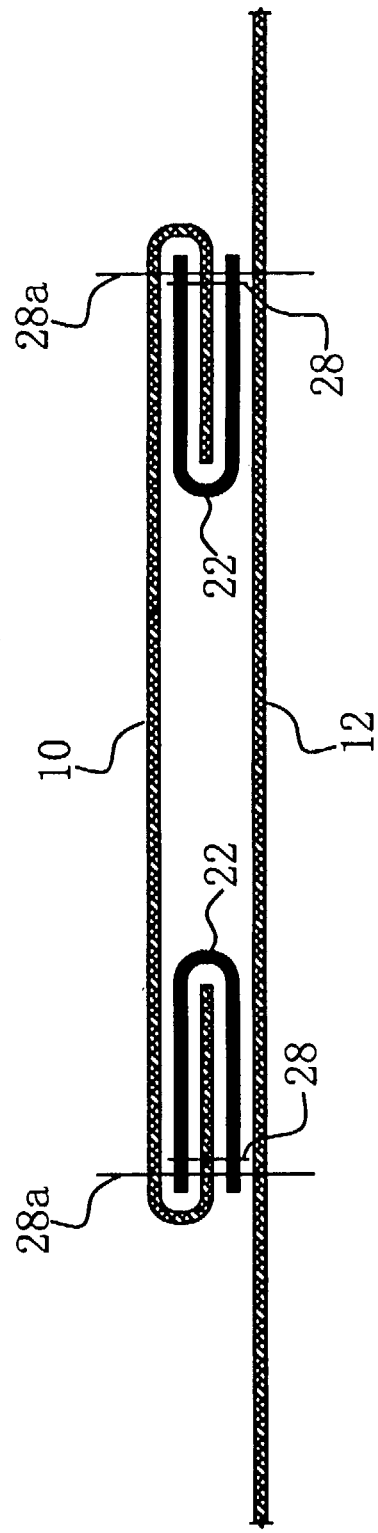

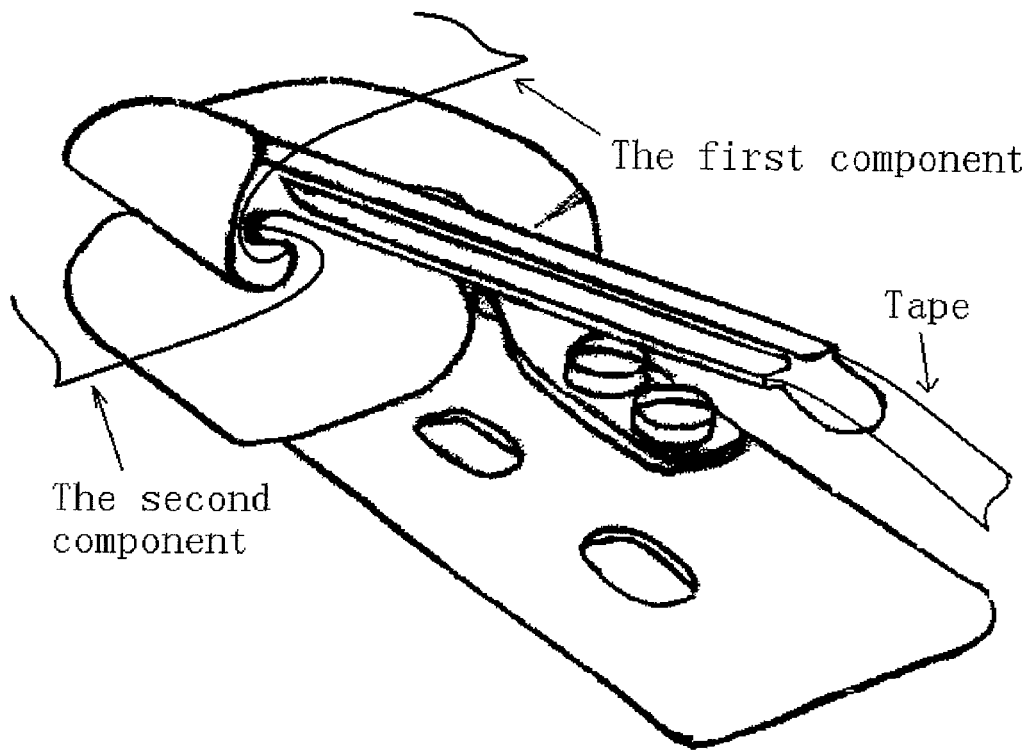
Folder Attachment 2
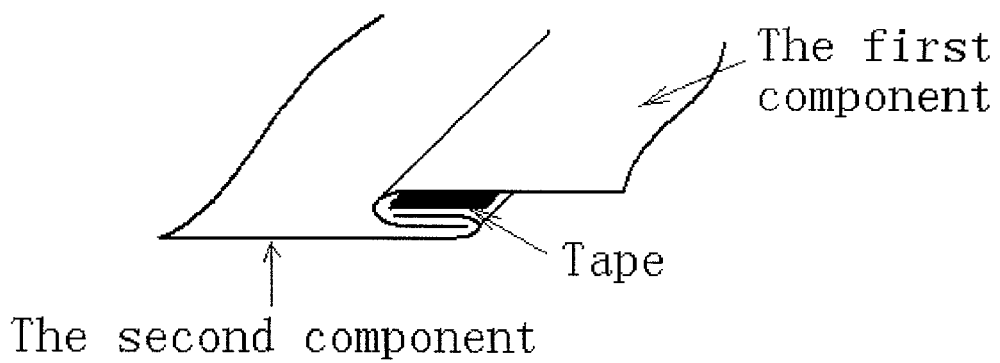
The seam with the Folder Attachment 2
Fig. 22A

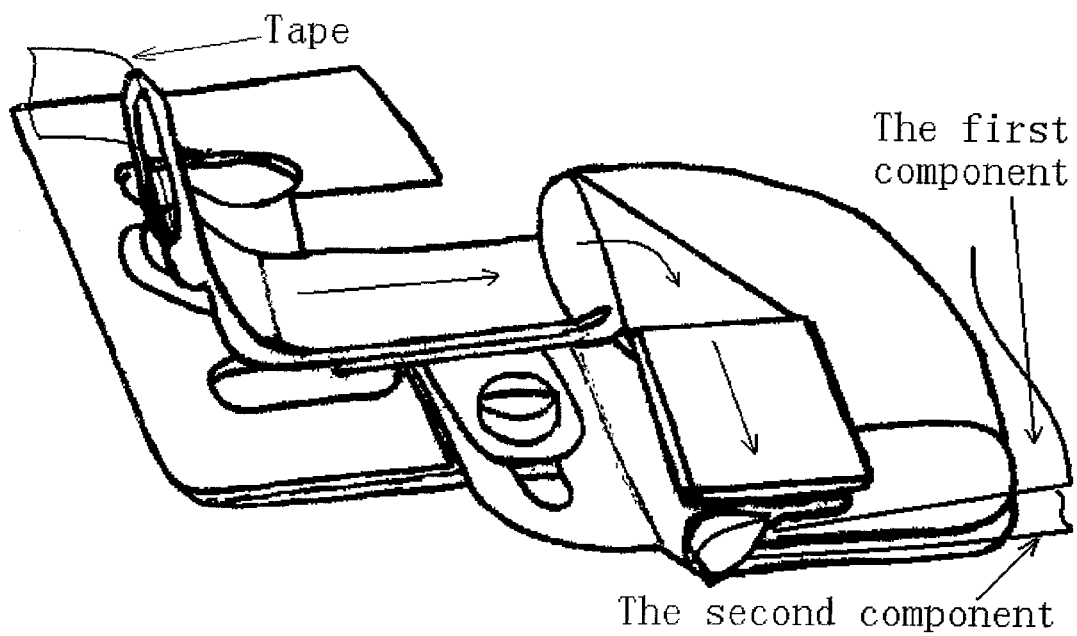
Folder Attachment 1
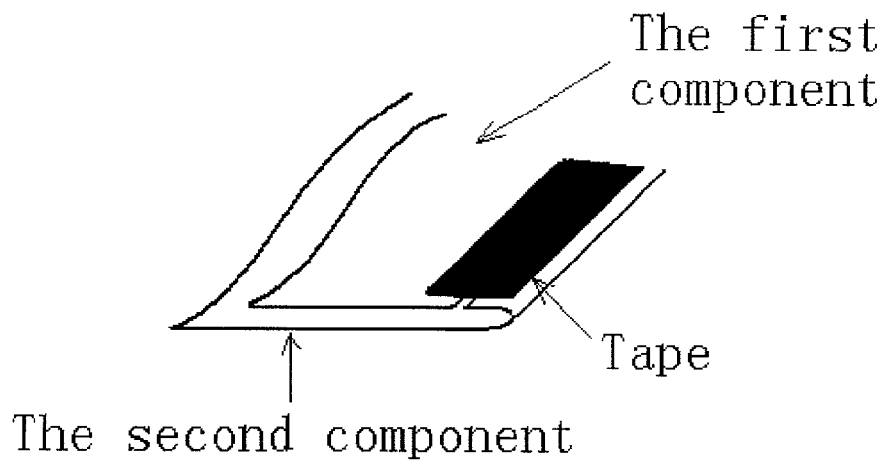
The seam with the Folder Attachment 1
Fig. 22B

WRINKLE FREE GARMENT AND METHOD OF MANUFACTURE

PRIOR RELATED APPLICATIONS

This application claims priority to Chinese Patent Application No. 01129786.7, filed on Oct. 18, 2001, which is incorporated by reference herein in its entirety.

FEDERALLY SPONSORED RESEARCH STATEMENT

Not applicable.

REFERENCE TO MICROFICHE APPENDIX

Not applicable.

FIELD OF THE INVENTION

The invention relates to wrinkle free garment seams and methods to manufacture them. More specifically, it is directed to an improved garment seam and method of manufacture which reduces the tendency of the seam to bunch or wrinkle around a sleeve attachment area and other similar areas after laundering.

BACKGROUND OF THE INVENTION

The garment industry has long been plagued by a wrinkling phenomenon at seam lines. Seam wrinkle is typically caused by thread shrinkage which occurs during laundering of a garment. In particular, after a garment is purchased by a garment consumer it is subjected to laundering cycles as the shirt is worn and becomes soiled. During these laundering and drying cycles the sewing thread typically undergoes a shrinkage, such as longitudinal shrinkage. The thread shrinkage rate may be greater than the surrounding shirt material, which creates wrinkling at a seam joining two panels of fabric. In addition, the sewing thread contracts upon being laundered and pulls on opposing garment components at the garment seam which in turn causes the garment components to buckle and thereby creating wrinkles along the garment seam. Accordingly, it would be desirable to provide a method of manufacturing garments which would be substantially free of wrinkle and which would maintain a smooth seam which is wrinkle free even after multiple laundering operations.

Numerous efforts have been made to reduce seam wrinkle. For example, one such attempt to reduce seam wrinkle utilizes special garment material. Specifically, the garment components sewn together at the seam are manufactured from material which stretches during the sewing process and which relaxes after the sewing process is complete. This relaxation provides for slack in the sewing thread.

Other attempts include altering the nature of the sewing thread used in the sewing process. For example, a composite sewing thread has been utilized in which one component of the thread is water soluble. During the laundering process the water soluble component dissolves gradually, thereby creating slack in the sewing thread which compensates for thread shrinkage.

In spite of the progress made in the art to reduce seam puckering, there continues to exist a need for an improved wrinkle-free seam and method of manufacture which produces a wrinkle-free seam for various garment components.

SUMMARY OF THE INVENTION

The above need is met by embodiments of the invention in one or more of the following aspects. In one aspect, the invention relates to a method for producing a wrinkle free seam between garment components each having an upper surface and a lower surface. The method comprises: (a) placing a bonding element comprising an adhesive material and having an upper surface and a lower surface between a first garment component and a second garment component; the adhesive material having a hot pressing melting point higher than about 160° C.; (b) sewing a set of stitches traversing through the bonding element and at least one of the garment components such that at least one seam is formed; (c) providing sufficient heat and/or pressure to effect the bonding of the adhesive material to at least one of the garment components to form a seam.

In some embodiments, the adhesive material has a peel strength of equal to or greater than about 0.5 or about 1.0 pound per inch. In one embodiment, the upper surface of the second garment component is adjacent to the lower surface of the bonding element, and the second garment component is folded such that the lower surface of the second garment component is adjacent to the upper surface of the first garment component. In another embodiment, the method further comprises sewing the bonding element between the garment components by sewing a first stitch along a side of the bonding element and a second stitch along an opposite side of the bonding element and wherein the first and second stitches penetrate through all surfaces. In one embodiment, the method may further comprise folding the first garment component such that the upper surface of the first garment component is adjacent to the upper surface of the bonding element. In some embodiments, the first garment component is folded over such that the upper surface of the first garment component is adjacent to the upper surface of the bonding element and the second garment component is reverse folded such that the lower surface of the second garment component is adjacent to the lower surface of the first garment component and wherein sewing the bonding element and the garment components comprises sewing a first stitch along a side of the bonding element and a second stitch along an opposite side of the bonding element, and the first and the second stitches penetrate through all surfaces. In other embodiments, there is a third garment component, and the upper surface of the first garment component is adjacent to the lower surface of the bonding element, the upper surface of the third garment component being adjacent to the lower surface of the first garment component and the lower surface of the third garment component being adjacent to the upper surface of the second garment component, the first garment component is folded such that the first garment component upper surface is adjacent to the upper surface of the bonding element and a seam is stitched through all surfaces along a side of the bonding element. In one embodiment, there is a third garment component, wherein the upper surface of the first garment component is adjacent to the lower surface of the bonding element, the upper surface of the third garment component is adjacent to the lower surface of the first garment component and the lower surface of the third garment component is adjacent to the upper surface of the second garment component, the first garment component is folded such that the upper surface of the first garment component is adjacent to the upper surface of the bonding element, the second garment component is reverse folded such that the lower surface of the second garment compo- nent is adjacent to the lower surface of the second garment component and a seam is stitched through all surfaces along a side of the bonding element. In other embodiments, the upper surface of the first garment component is adjacent to the lower surface of the bonding element, the upper surface is folded to also be adjacent to the upper surface of the first garment component and then the upper surface is further folded such that the lower surface of the first garment component is adjacent to the bonding element upper surface, and a seam is stitched through all surfaces along a side of the bonding element. In one embodiment, the upper surface of the first garment component is adjacent to the lower surface of the bonding element and the lower surface of the first garment component is adjacent to the upper surface of the second garment component, the first garment component is folded such that the upper surface of the first garment component is adjacent to the upper surface of the bonding element, the first garment component is further folded and reverse folded such that the lower surface of the first garment component is adjacent to the lower surface of the second garment component and a seam is stitched through all surfaces along a side of the bonding element. In other embodiments, the first garment component has two substantially parallel sided edges and a bottom edge forming a pocket of a shirt, the method further comprising placing the bonding element along the side edges and bottom edge of the first garment component such that the upper surface of the bonding element contacts the lower surface of the first garment component, the first garment component is reverse folded such that the side edges and bottom edge of the first garment component fold over the bonding element such that the lower surface of the first garment component is folded over and is adjacent to the lower surface of the bonding element, placing the first garment component adjacent to the second garment component such that the upper surface of the second garment component is adjacent to the folded over upper surface of the first garment component, and sewing a stitch through all surfaces along a side of the bonding element, all around the sides and bottom edges of the first garment component.

In some embodiments, there is a first garment component and a second garment component, the upper surface of the first garment component is adjacent to the lower surface of the second garment component, the upper surface of second garment component is adjacent to the lower surface of the bonding element and a seam is stitched along a side of the bonding element through all surfaces, wherein the first garment component is folded such that a portion of the first garment component lower surface is adjacent to the lower surface of the bonding element and the second garment component is folded such that the upper surface of second garment component is adjacent to the upper surface of the bonding element and a seam is stitched along an opposite side of the bonding element through all surfaces. In other embodiments, there is a first garment component and a second garment component, the upper surface of the first garment component is adjacent to the lower surface of the second garment component, the upper surface of the second garment component is adjacent to the lower surface of the bonding element, wherein the first garment component is folded such that a portion of the first garment component lower surface is adjacent to the lower surface of the bonding element and a seam is stitched along a side of the bonding element with a second seam being stitched along an opposite side of the bonding element, both seams penetrating all surfaces and the second garment component is folded such that the upper surface of second garment component is adjacent to the upper surface of the bonding element and a seam is stitched between the first and second seam through all surfaces. In one embodiment, there is a first garment component, a second garment component and an interlining, the interlining being adjacent to the lower surface of the bonding element and in contact with the upper surface of the first garment component, the upper surface of the second garment component being adjacent to the lower surface of the first garment component, wherein the interlining is recessed from an edge of the bonding element, wherein the bonding element and first garment component is folded such that the upper surface of the bonding element is folded upon itself, leaving only the lower surface of the bonding element for bonding adjacent to the interlining and reverse folding the second garment component such that the lower surface of the second garment is adjacent to itself In some embodiments, providing sufficient heat and/or pressure to fuse the adhesive material to garment components comprises the steps of pressing at a pressure of from about 2.5 to about 8.0 kilograms per square centimeter and a temperature of from about 150 to about 190° C. for about 5 to about 30 seconds. In one embodiment, the bonding element comprises an interlining having the adhesive material on at least one surface of the interlining. Optionally, the bonding element consists entirely of a solid thermal adhesive film. In some embodiments, the bonding element is folded such that the upper surface abuts itself and the lower surface is the only surface available for bonding. In other embodiments, an attachment folder is used to place the bonding element between the garment components and to fold the garment components. Various garment seams can be manufactured by the above methods. For example, the garment seam can be a hem button stay seam or a hem bottom seam; a pocket seam; a sleeve seam or a close side seam; a placket slit seam; a yoke seam or a join shoulder seam, or a combination thereof.

In another aspect, the invention relates to a garment seam. The garment seam comprises: (a) a first garment component; (b) a second garment component positioned adjacent to the first garment component to define a seam; (c) a bonding element between the first garment component and the second garment component, the bonding element comprising an adhesive material and being directly bonded to at least one garment component, the adhesive material having a hot pressing melting point of at least about 160° C.; and (d) a set of stitches traversing through the bonding element and at least one of the garment components. The garment seam can be a hem button stay seam or a hem bottom seam; a pocket seam; a sleeve seam or a close side seam; a placket slit seam; a yoke seam or a join shoulder seam, or a combination thereof. The structures of these seams are illustrated in the accompanying figures.

In still another aspect, the invention relates to another type of garment seam. The garment seam comprises (a) a first garment component having a first surface and a second surface, the first garment component being reverse folded once to divide the first garment component into an unfolded portion and a folded portion, the first surface in the unfolded portion facing the first surface in the folded portion; (b) a bonding element in a substantially U shape having an inner surface and an outer surface, the inner surface of the bonding element being adjacent to the first and second surface of the first garment component in the folded portion, the bonding element comprising an adhesive material on at least one of the surfaces; (c) a set of stitches traversing through the bonding element and at least a portion of the first garment component, wherein at least one surface of the bonding element is bonded to at least one surface of the first garment component by the adhesive material. Any adhesive material may be used in this type of garment seam.

In yet another aspect, the invention relates to a method of making another type of garment seam. The method comprises (a) providing a first garment component having a first surface and a second surface; (b) reverse folding the first garment component a first time to divide the first garment component into an unfolded portion and a folded portion; the first surface in the unfolded portion facing the first surface in the folded portion; (c) positioning a bonding element adjacent to the first garment; the bonding element having an inner surface and an outer surface; the bonding element comprising an adhesive material on at least one of the surfaces; (d) causing the inner surface of the bonding element to directly or indirectly abut both the first and second surface of the first garment component in the folded portion; (e) stitching through the bonding element and at least a portion of the first garment component to form a seam, and (f) applying heat and/or pressure to the seam to bond the adhesive material to at least one surface of the first garment component.

In some embodiments, the bonding element has the adhesive material coated on the inner surface which is directly bonded to the first and second surfaces of the first garment component in the folded portion. Optionally, the bonding element has the adhesive material coated on the outer surface, and a portion of the outer surface is directly bonded to the first surface of the first garment component in the unfolded portion. In one embodiment, the bonding element is an adhesive tape in a U-shape, the inner surface of the adhesive tape is directly bonded to both the first and second surfaces of the first garment component, and a portion of the outer surface of the adhesive tape is directly bonded to the first surface of the first garment component in the unfolded portion.

In some embodiments, the first component is reverse folded a second time to divide the first component into the folded portion, a second folded portion, and a second unfolded portion, the outer surface of the adhesive tape is directly bonded to first surface of the first garment component in the folded portion and is also directly bonded to the first surface of the first garment component in the second unfolded portion. In other embodiments, there is a second garment component having a first surface and a second surface, the second garment component is reversed folded into a folded portion and unfolded portion, the first surface of the second garment component is directly bonded to the outer surface of the adhesive tape, and second surface of the folded portion of the second garment directly abuts the first surface of the first garment in the unfolded portion. In some embodiments, there are a second garment component having a first surface and a second surface and a third garment component, the first surface of the second garment component directly abuts a portion of the outer surface of the adhesive tape, and one surface of the third garment component directly abuts the second surface of the second garment component. In one embodiment, the third garment component is reverse folded once to divide the third garment component into a folded portion and an unfolded portion, and the unfolded portion of the third garment component points to the same direction as the unfolded portion of the first garment. In another embodiment, the folded portion of the third garment component directly bonds to a second U-shaped adhesive tape having an inner surface and an outer surface, both the first surface and the second surface of the third garment component in the folded portion directly bond to the inner surface of the second U-shaped adhesive tape.

In some embodiments, there is a substantially planar adhesive tape placed between the second garment component and the folded portion of the third garment component. In other embodiments, there is a second garment component having one surface directly bonded to another portion of the outer surface of the adhesive tape. In one embodiment, the unfolded portion of the first garment component is folded a second and third time into a substantially U shape comprising the folded portion, a first unfolded portion, a second unfolded portion, and a second folded portion, wherein the folded portion connects directly to the first unfolded portion which is connected to the second unfolded portion which is in turn directly connected to the second folded portion, and wherein the second surface of the first garment component in the second folded portion faces a portion of the outer surface of the bonding element. In some embodiments, there is a second garment component have a first surface and a second surface, the second garment is placed between the folded portion and the second folded portion, the first surface of the second garment component is adjacent to the second surface of the first garment component in the second folded portion and the second surface of the second garment component is adjacent to a portion of the outer surface of the bonding element. In one embodiment, there is a substantially planar bonding element placed to abut the first surface of the second garment component and the second surface of the first garment in the second folded portion. In other embodiments, there is a second substantially U-shaped adhesive tape having a inner surface and an outer surface, and the second bonding element is placed in the second folded portion such that the inner surface of the adhesive tape directly bonds both the first surface and the second surface of the first garment and a portion of the outer surface of the adhesive tape directly bonds the first surface of the first garment component.

Additional aspect of the invention and the characteristics and advantages provided by various embodiments of the invention are apparent with the following description.

BRIEF DESCRIPTION OF THE DRAWINGS

FIGS. 13A–13B show a cross-sectional view of a hem button stay seam made by an alternative method according to embodiments of the invention.

FIGS. 14A–14B show a cross-sectional view of a pocket seam made by an alternative method according to embodiments of the invention.

FIGS. 22–22B illustrate the use of an attachment folder to assemble and stitch a seam according to embodiments of the invention.

DESCRIPTION OF EMBODIMENTS OF THE INVENTION

Figure 1A:
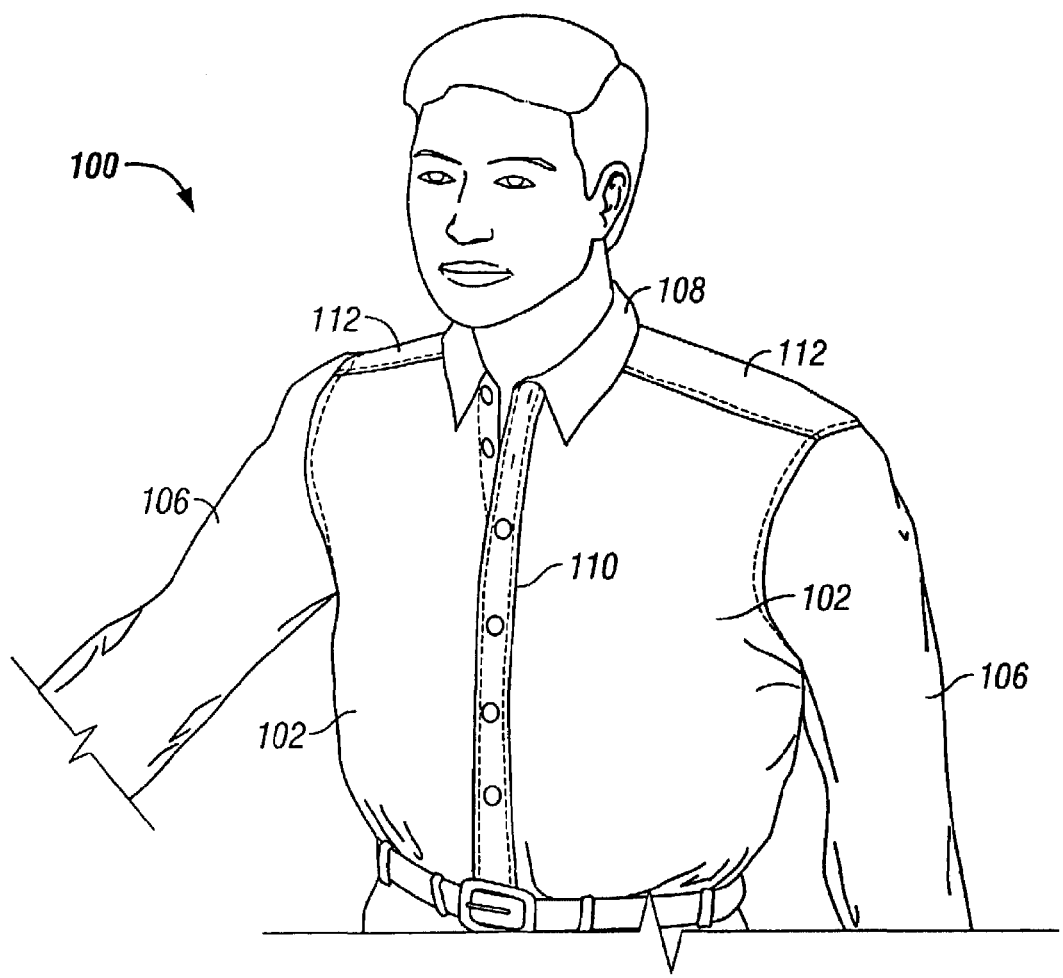
FIGS. 1A–1C show a human figure wearing a shirt having seams manufactured in accordance with embodiments of the invention.

Embodiments of the invention provide wrinkle free seams for garments by using a bonding element. The bonding element is placed between one or more garment components, sewn into place, and then is subject to sufficient heat and/or pressure to bond at least one of the garment components. The seams made in accordance with embodiments of the invention have less tendency to form wrinkle or pucker. Therefore, wrinkle free garments, such as shirts, pants, skirts and blouses, can be obtained. It should be recognized that the term "wrinkle free" or similar terms used herein do not mean that the seam or garment is completely free of wrinkle or pucker. A small amount of wrinkle or pucker, visible or invisible, may be present or develop as a result of wearing and/or laundering.

The bonding element used in some embodiments of the invention comprises an adhesive with a melting point of higher than about 150° C. The melting point used herein refers to the hot pressing melting point of the adhesive material. Generally, the adhesive is in the form of tape, coating, or film, although it may also be a net or web. Some suitable adhesive materials have a melting point of at least about 160° C., such as about 161, 165, 170 175, 180, 185, 190° C. Adhesive materials with a melting point higher than 200° C. may also be used. Preferably, the adhesive material is a thermal adhesive, although other types of adhesive materials can also be used. Examples of suitable adhesive material include, but are not limited to, thermoplastic resin materials, such as polyethylene, polyester, polyurethane and polyamide. The polyethylene is preferably a high density polyethylene. The aforementioned adhesives are preferable because they all have the desired properties. Additional suitable adhesive materials may be selected from those disclosed in the following U.S. patents so long as the disclosed adhesive compositions meet the criteria for stated herein: U.S. Pat. Nos. 6,340,236; 6,333,119; 6,294,239; 6,291,583; 6,288,149; 6,284,328; 6,284,185; 6,277,488; 6,274,643; 6,265,460; 6,235,818; 6,216,699; 6,180,229; 6,136,732; 6,095,996; 6,093,464; 6,022,914; 5,973,056; 5,969,025; 5,939,499; 5,939,488; 5,939,477; 5,905,099; 5,902,843; 5,900,465; 5,891,957; 5,883,148; 5,719,226; 5,700,874; 5,698,656; 5,677,038; 5,670,566; 5,618,281; 5,583,182; 5,561,203; 5,554,697; 5,536,799; 5,534,575; 5,532,319; 5,527,845; 5,516,835; 5,461,095; 5,454,862; 5,441,808; 5,428,109; 5,418,052; 5,380,779; 5,360,854; 5,354,619; 5,352,741; 5,331,049; 5,326,605; 5,290,838; 5,286,781; 5,242,984; 5,210,147; 5,190,607; 5,183,705; 5,177,133; 5,166,302; 5,147,916; 5,143,972; 5,143,761; 5,091,454; 5,059,487; 5,034,251; 5,026,756; 5,021,257; 5,013,785; 4,985,535; 4,985,499; 4,965,320; 4,944,994; 4,914,162; 4,891,269; 4,886,853; 4,871,811; 4,855,382; 4,820,769; 4,780,367; 4,780,358; 4,775,719; 4,755,245; 4,737,410; 4,725,641; 4,699,938; 4,693,935; 4,665,106; 4,659,785; 4,587,313; 4,556,464; 4,554,324; 4,524,104; 4,517,340; 4,500,661; 4,463,115; 4,400,486; 4,379,887; 4,374,231; 4,359,556; 4,359,551; 4,352,749; 4,299,934; 4,288,567; 4,288,480; 4,286,077; 4,252,712; 4,219,460; 4,217,435; 4,172,860; 4,167,433; 4,157,319; 4,141,876; 4,141,774; 4,133,789; 4,133,731; 4,117,027; 4,105,611; 4,104,323; 4,097,548; 4,097,434; 4,081,415; 4,060,503; 4,059,715; 4,052,483; 4,037,016; 4,018,733; 3,993,613; 3,980,735; 3,970,623; 3,954,692; 3,950,291; 3,932,330; 3,932,329; 3,932,328, the disclosures with respect to an adhesive composition in all of the preceding patents are incorporated by reference herein in their entirety.

In some embodiments, solid adhesive tapes are used as a bonding element. Solid adhesive tapes refer to those tapes which do not have a substantial amount of voids, as compared to adhesive webs or nets which have a substantial amount of hole and/or voids. Because the adhesive tapes are solid pieces, they have a higher bulk density, rigidity, and/or tensile strength. This facilitates the handling of the tapes during manufacturing such that better seams are obtained. The adhesive tape generally has a width of from about 3 mm to about 16 mm or from about 16 mm to about 30 mm and a thickness of from about 5 to 50 micrometers, although variations are possible. In some embodiments, the adhesive tape has a bulk density greater than similar to or slightly lower than the density of the adhesive material, e.g., about 0.8 gram per cubic centimeter (g/cc). For example, the bulk density of adhesive tape may be in the range of from about 0.885 gram per cubic centimeter (g/cc) to about 1.0 gram per cubic centimeter (g/cc). "Bulk density" of an adhesive tape refers to the density obtained by dividing the weight of the tape by its corresponding volume. When the tape has no voids, the bulk density is approximately the density of the material making up the tape. However, when there are voids in the tape, the bulk density is lower than the density of the tape material. The solid adhesive tape has a bulk density equal to or substantially equal to the density of the tape material. In other words, the solid adhesive tapes are substantially free of voids. An example of a suitable adhesive tape is available under the trade name Permess 925 from Ten Cate Permess Ltd., Hong Kong, P. R. China.

In other embodiments, the adhesive tapes have a relatively higher peel adhesion to a garment component (e.g., cloth). The peel strength can be measured by procedures similar to ASTM D3330/D3330M-00 Standard Test Method for Peel Adhesion of the Pressure-Sensitive Tape or PSTC-1 (Pressure Sensitive Tape Council) Peel Adhesion of Single Coated Pressure Sensitive Tapes at 180° Angle, all of which are incorporated by reference herein in their entirety. The peel adhesion should be equal to or higher than about 0.2 pound per inch (lb./in.). For example, the peel adhesion can be equal to or higher than about 0.3 pound per inch (lb./in.), about 0.4 pound per inch (lb./in.), about 0.5 pound per inch (lb./in.), about 0.6 pound per inch (lb./in.), about 0.7 pound per inch (lb./in.), about 0.8 pound per inch (lb./in.), about 0.9 pound per inch (lb./in.), or about 1.0 pound per inch (lb./in.). Higher peel adhesions, such as about 1.1 pounds per inch (lbs./in.), about 1.2 pounds per inch (lbs./in.), about pounds per inch (lbs./in.), about 1.4 pounds per inch (lbs./in.), or about 1.5 pounds per inch (lbs./in.) or higher, may also be used. In some instances, the peel adhesion can exceed about 2.0 pounds per inch (lbs./in.), about 2.5 pounds per inch (lbs./in.), or about 3.0 pounds per inch (lbs./in.).

Generally, the adhesive tapes are used as a flat piece without additional folding. However, whenever an unfolded flat piece of adhesive tape is used, a folded piece of adhesive tape can also be used instead. The adhesive tape can be folded once or multiple times. Once-folded adhesive tapes refer to the structure obtained by folding only one time a flat adhesive tape with a first and second surfaces along a line so that a portion of the first surface contacts another portion of the first surface, while the second surface becomes the outer surface of the entire structure. Sometimes, the folded portions of the first surface directly contacts each other. In this case, after be subjected to heat and/or pressure, the first surface may completely disappear due to the melting and fusion of the adhesive material. Other times, the folded portions of first surface are not in direct contact. For example, the adhesive tape is folded around a portion of a garment component such that the first surface of the adhesive tape is in direct contact with both surfaces (i.e., first and second surfaces) of the garment component. After being subjected to heat and/or pressure, the first surface of the folded adhesive tape bonds directly to the both surfaces of the garment component.

On the one hand, the adhesive material may be one of the components forming the bonding element. On the other hand, the adhesive material may also be the only component forming the bonding element. For example, the bonding element may comprise an interlining with an adhesive material coated on one or both surfaces of the interlining. The coating on the surface of the interlining need not be uniform, although it is preferred to have a uniform coating on one or both surfaces of the interlining. In some embodiments, however, the bonding element consists of the adhesive tape, either folded or unfolded.

In general, garments are made from a plurality of components. In almost every shirt seam there is a first garment component and a second garment component along a corresponding seam. Special garment components, such as a collar or a yoke, generally do not affect the sewing operation. Between the first garment component and the second garment component, there is a bonding element which is adjacent to the first garment component. The second garment component may also be adjacent to the bonding element when sewing. In some embodiments, stitches are run through the bonding element, the first garment component and the second garment component. In other embodiments, stitches are run through the bonding element and only one of the garment components. The first garment component is then folded to overlap the bonding element and a top stitch is run to finish sewing. In an alternate embodiment, the top stitch is run to bind the bonding element, the first garment component, and the second garment component directly. Attachment folders are used to lead the bonding element between the first garment component and the second garment component. There are a variety of attachment folders for use in the various steps of making a shirt. After each seam is made, the seam is pressed along the working line in order to make the adhesive of the bonding element fuse to the components to which it is adjacent. Typically, the seams are pressed at a pressure of from about 2.5 to about 8.0 kilograms per square centimeter and a pressing temperature of from about 150 to about 190° C. for about 5 to about 30 seconds. Other pressing temperatures, pressures, and durations may also be used.

Shirts, in particular, dress shirts include such components as a collar, a pair of front panels, a back panel, a yoke, a set of sleeves, and plackets for various components. All of these components are put together with a variety of seams and stitches. While the embodiments illustrated herein are for a dress shirt, the methods for wrinkle free seams can be used to make any garment or product that requires a wrinkle free seam, with or without modifications.

Figure 1B:
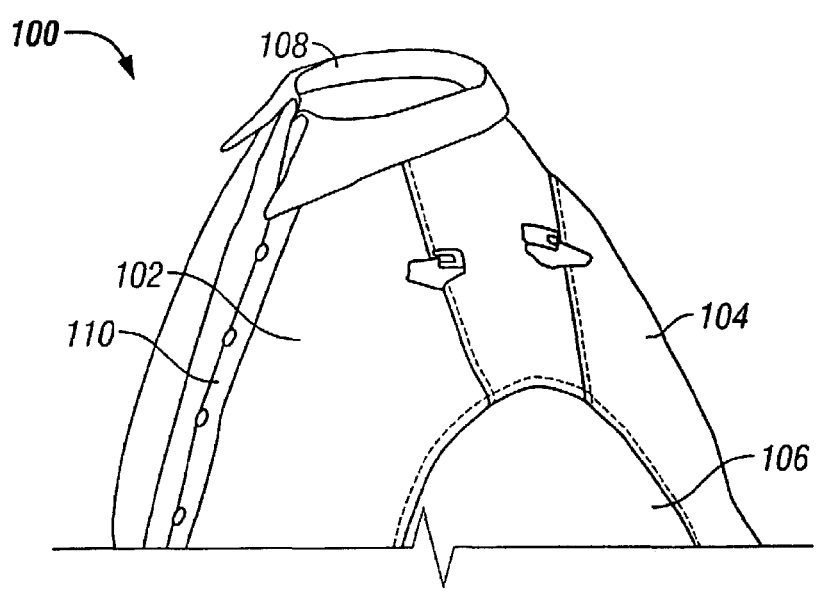
Figure 1C:
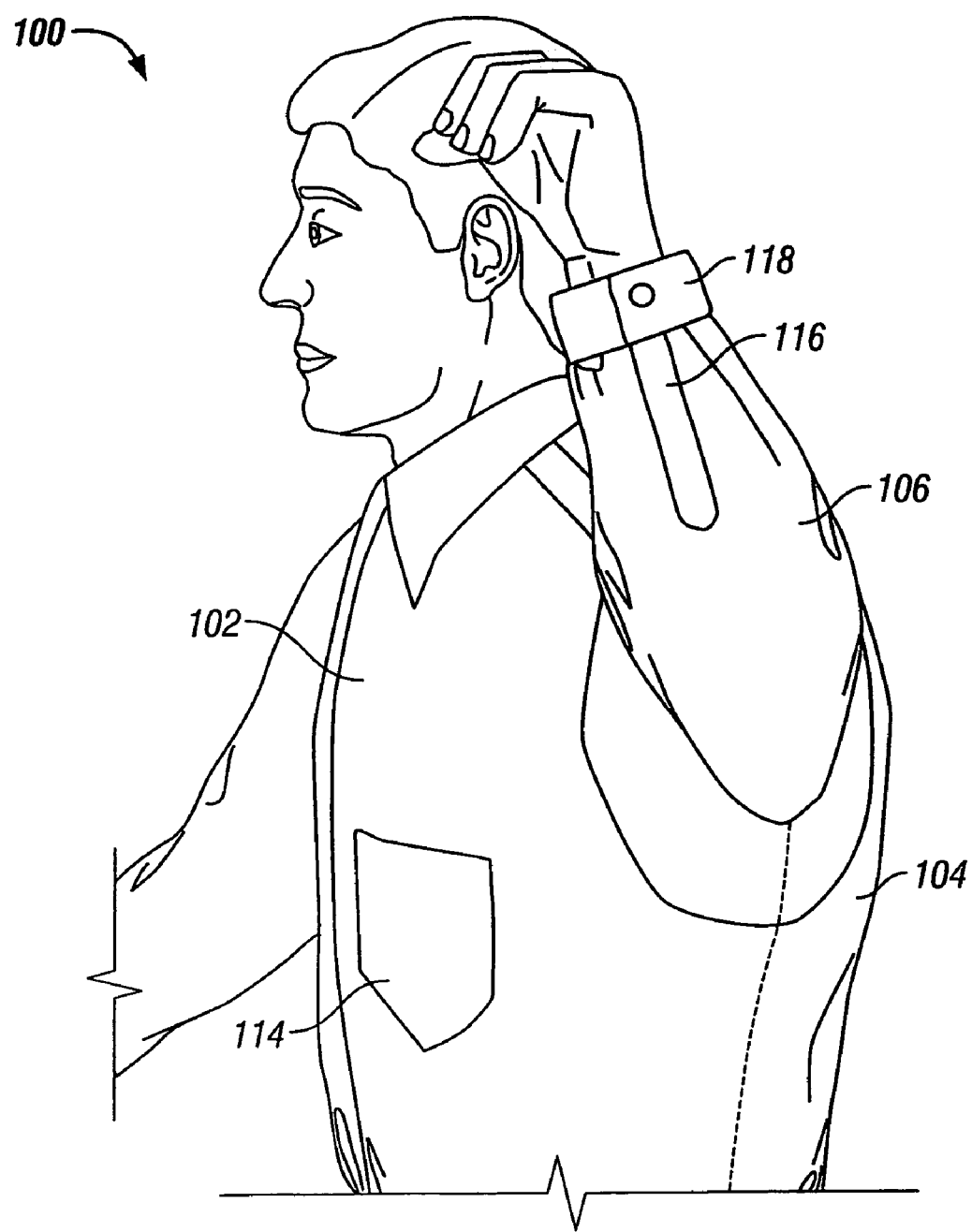

FIGS. 1A–1C show a human figure wearing a shirt having seams manufactured in accordance with embodiments of the invention. The shirt 100 has a pair of front panels 102, a back panel 104, a set of sleeves 106, a collar 108, a central button placket 110 and a shoulder yoke 112. The shirt further includes a pocket 114 and a shirt sleeve placket 116. The yoke 112 preferably has an outer panel and an inner panel. The collar 108 preferably has a first collar component and a second collar component. In FIGS. 2–12, the same reference numbers are utilized to depict similar seam components.

Figure 2A:
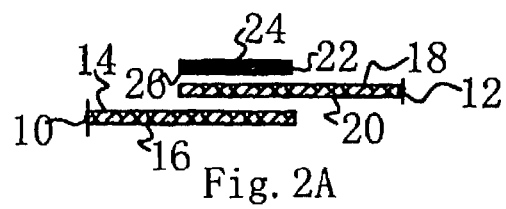
FIGS. 2A–2D are a cross-sectional view of a shirt armhole seam at various manufacturing stages according to embodiments of the invention.
Figure 2B:
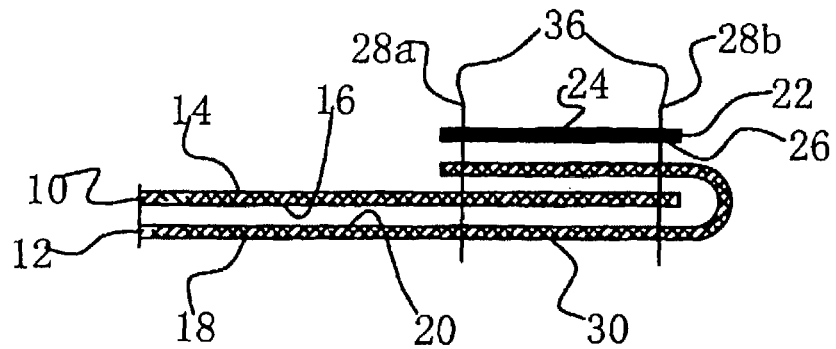
Figure 2C:
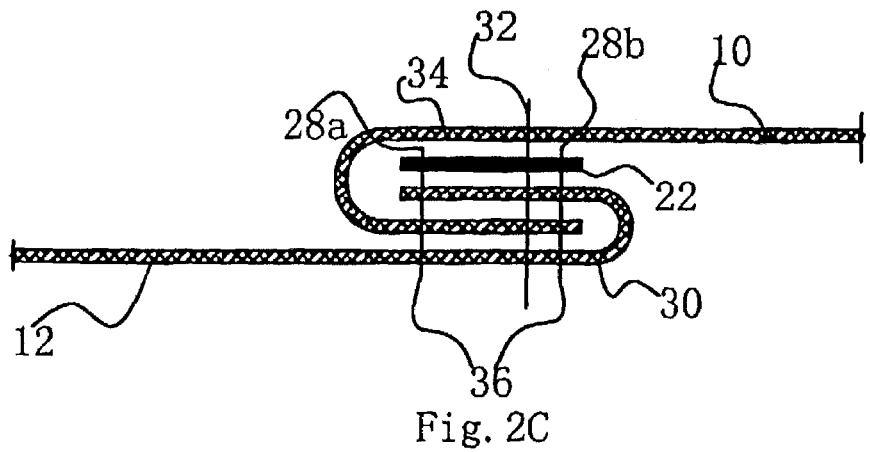

FIGS. 2A–2D are a cross-sectional view of a shirt armhole seam at various manufacturing stages according to embodiments of the invention. Specifically, FIGS. 2A–2C illustrate one method for manufacturing an armhole seam. A first garment component 10 and a second garment component 12 are to be joined, forming a sleeve in a shirt. The first garment component 10 is a front panel 102, a shoulder yoke 112 or a rear panel 104, the second garment component 12 is a shirt sleeve 106. The first garment component 10 has an upper surface 14 and a lower surface 16. The second garment component 12 has an upper surface 18 and a lower surface 20.

A bonding element 22 is part of the armhole seam. The bonding element 22 has an upper surface 24 and a lower surface 26. The first garment component 10, the second garment component 12 and the bonding element 22 are positioned as shown in FIG. 2A. The second garment component 12 is reverse folded such that the lower surface 20 is adjacent to the lower surface 16 of the first garment component, as shown in FIG. 2B. At least one stitch 28 is sewn along a seam line defined by the first garment component 10 and second garment component 12. Preferably, the seam line is along a side of the bonding element 22. In one embodiment, a first stitch 28a is sewn along a seam line on a side of the bonding element 22 and a second stitch 28b is sewn along a seam line on an opposite side of the bonding element 22. The first stitch 28a and second stitch 28b are preferably double needle set sleeve stitches. The stitches 28 are made through the bonding element 22, the second garment component 12, the first garment component 10 and the reverse folded portion 30 of the second garment component 12. After the stitches 28 are sewn, the first garment component 10 is folded over the bonding element 22, such that the upper surface 14 of the first garment component is adjacent to the upper surface 24 of the bonding element 22. At least one stitch 32 is sewn to attach the folded over portion 34 of the first garment component 10 to the bonding element 22. In one embodiment, the stitch 32 is a top stitch traversing through all surfaces, including the folded over portion 34, the bonding element 22, the second garment component 12, the first garment component 10, and the folded over portion 30, as shown in FIG. 2C.

The manufacture of the seam is completed with the application of heat and/or pressure to the seam. This can be accomplished with a conventional ironing process. No steam is necessary during ironing. For improved control and quality, this process is usually carried out on a heated press with a temperature of up to about 190° C. for about 5 to about 30 seconds and a pressure of about 2.5 to about 8.0 kilograms per square centimeter. Optionally, it is followed by a vacuum step to cool and set the adhesive. The applied heat and/or pressure causes the adhesive of the bonding element 22 to melt and flow onto the surfaces adjacent to it. That is, the adhesive flows onto the folded portion 34 of the first garment component 10, and the upper surface 18 of the second garment component 12. During the hot pressing process, the flowing adhesive becomes interposed in the garment fabric of the components it is adjacent to. This is desirable in that it creates a relatively strong bond between the surfaces of the garment components and the thread along the seam. This bond helps prevent seam wrinkle during subsequent laundering. The bonding element 22 creates a bond between the garment surfaces and the thread of the stitch. In particular, because the garment components are bonded together along the seam, they tend not to be pulled apart during laundering and, therefore, buckling of the seam fabric is prevented. In particular, the seam fabric located between the stitches 28a and 28b is prevented from wrinkling due to the components being bonded together by the bonding element 22. The hot pressing process also compresses the seam to reduce the seam thickness. In some embodiments, the bonding element still exists as a separate and distinct layer after hot-pressing. However, in other embodiments, the bonding element completely melts and merges with the adjacent garment components such that the bonding element does not exist as a separate layer but still bonds the adjacent garment components together.

The distance 36 between stitches 28a and 28b is the seam width. The folded portion 34 is the visible portion of the armhole seam. As such, for optimal prevention of wrinkle it is important to have the adhesive of the bonding element 22 flow over the entire seam width 36. This ensures complete bonding of the folded portion 34 of the first garment component 10 to the upper surface 18 of the second garment component which abuts the lower surface 26 of the bonding element 22.

Figure 2D:
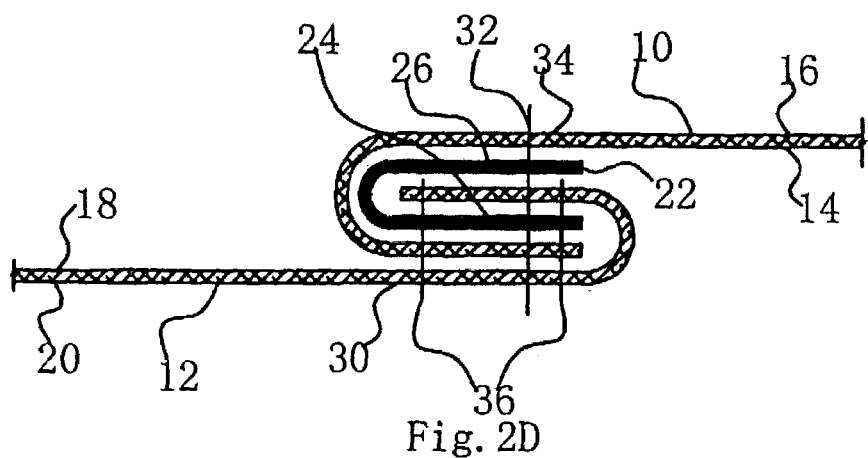

In an alternate embodiment as illustrated in FIG. 2D, the bonding element 22 is folded around an edge portion of the garment component 12. The first garment component 10 is folded around the bonding element 22 such that the lower surface 26 of the bonding element abuts the upper surface 14 of the first component 10. Moreover, the upper surface 24 of the bonding element 22 abuts both the upper and lower surfaces of the garment component 12 in the folded portion. The edge portion of the garment component 10 is sandwiched between a portion of the bonding element 22 and the folded portion 30 of the second garment component 12. Moreover, the upper surface 14 of the first garment component 10 in the edge portion abuts a portion of the lower surface 26 of the bonding element 22, while the lower surface 16 of the first garment component 10 in the edge portion abuts the upper surface 18 of the second garment 12. Both the upper surface 18 and lower surface 20 of the second garment component 12 in the edge portion abut the upper surface 24 of the bonding element 22. Optionally, at least one stitch 32 is sewn to secure the folded over portion 34 of the first garment component 10 and the folded bonding element 22. In one embodiment, the stitch 32 is a top stitch traversing through all surfaces, including the folded over portion 34, the folded bonding element 22, the second garment component 12, the first garment component 10, and the folded over portion 30, as shown in FIG. 2D. Optionally, a set of double stitches 36 is sewn through a portion of the bonding element 22, a portion of the first garment component 10, the folded portion 30 of the second component 12. Heat and/or pressure are applied as described above to complete the manufacture of the seam. The bonding element melts and flows to secure the first component and the second component to the bonding element where they are in contact with the bonding element.

Figure 3A:
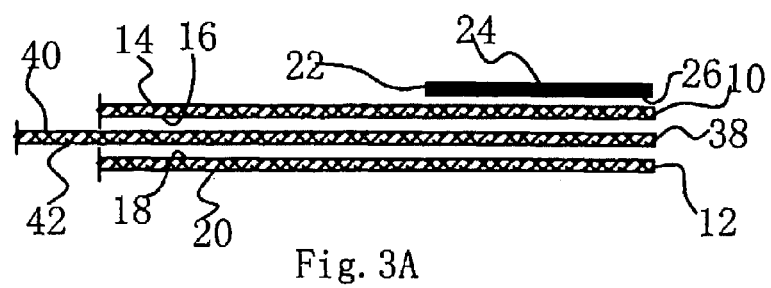
FIGS. 3A–3C are a cross-sectional view of a yoke seam at various manufacturing stages according to embodiments of the invention.
Figure 3B:
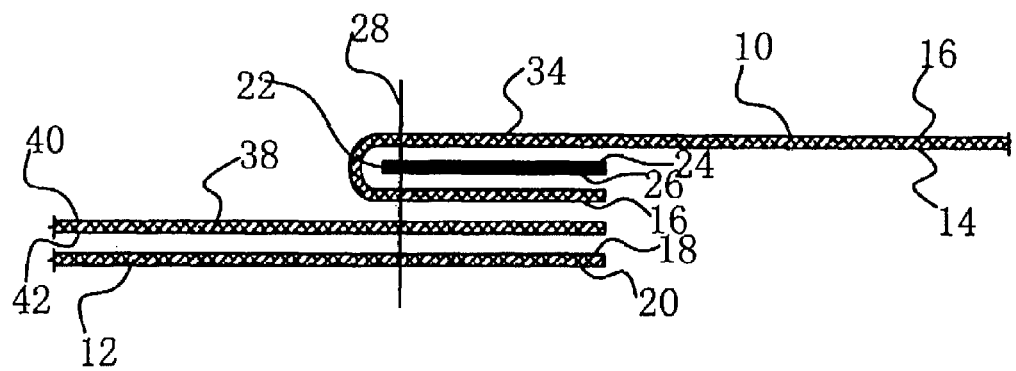
Figure 3C:
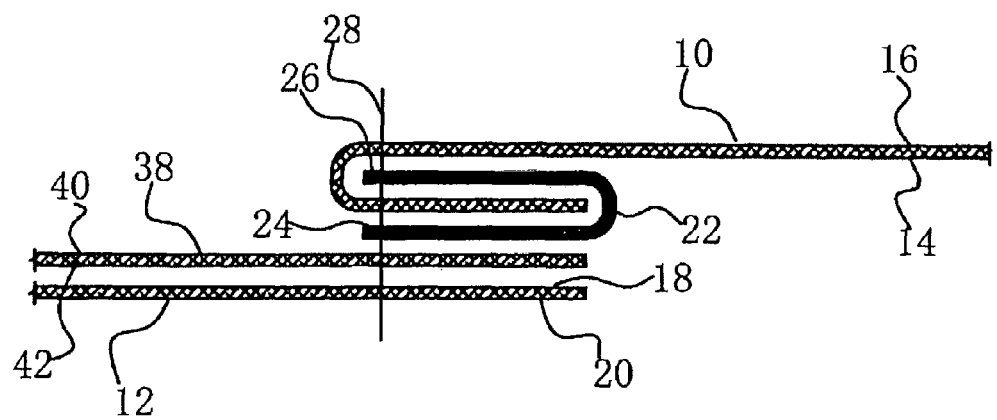

FIGS. 3A–3C are a cross-sectional view of a yoke seam at various manufacturing stages according to embodiments of the invention. FIGS. 3A and 3B illustrate one suitable method for manufacturing a garment yoke seam. The method is particularly suitable for making either the yoke-to-front panel seam or the yoke-to-back panel seam. In one embodiment, there is a first garment component 10, a second garment component 12, and a third garment component 38. The first garment component 10 is an outer panel 112a of the shirt yoke, the second garment component 12 is an inner panel 112b of the shirt yoke, and the third garment component 38 is a panel of the dress shirt. The panel is either of the front panels 102 or the back panel 104, depending on if the seam is the yoke-to-front seam or the yoke-to-back seam. The third garment component 38 has an upper surface 40 and a lower surface 42. The bonding element 22, the first garment component 10, the third garment component 38 and the second garment component 12 are arranged as shown in FIG. 3A. The first garment component 10 is folded over such that the upper surface 14 of the first garment component 10 abuts the upper surface 24 of the bonding element 22. At least one stitch 28 is sewn along a seam line along a side of the bonding element 22. The stitch 28 is preferably a top stitch that is made through the folded over portion 34 of the first garment component 10, the bonding element 22, the third garment component 38, and the second garment component 12. The method further includes reverse folding the second garment component 12 such that the lower surface 20 abuts itself before heat and/or pressure are applied. This would allow the reverse folded portion (not shown in FIG. 3B but similar to the folded portion 30 of FIG. 4A) to be next to the wearer's skin. No stitching would be next to the wearer's skin and thus no discomfort is experienced. Heat and/or pressure are applied as described above to complete the manufacture of the seam. The adhesive of the bonding element 22 melts and flows over the surfaces of the folded portion 34 and the upper surface 14 of the first garment component 10. The folded portion 34 is the visible portion of the seams. Preferably, the adhesive of the bonding element 22 melts to bond the first garment component 10 and the stitch 28.

In an alternate embodiment as shown in FIG. 3C, the bonding element 22 is folded around an edge portion of the first garment component 10 such that the upper surface 24 of the bonding element 22 abuts both the upper surface 14 and the lower surface 16 in the edge portion of the garment component 10. A portion of the lower surface 26 abuts the upper surface 40 of the garment component 38, and another portion of the lower surface 26 of the bonding element 22 abuts the folded portion of the upper surface 14 of the garment component 10. Moreover, the upper surface 18 of the garment component 12 abuts the lower surface 42 of the garment component 38. A set of stitches 28 can be sewn through the seam. Heat and/or pressure are applied as described above to complete the manufacture of the seam. The bonding element melts and flows to secure the first component and the third component where they are in contact with the bonding element.

Figure 4A:
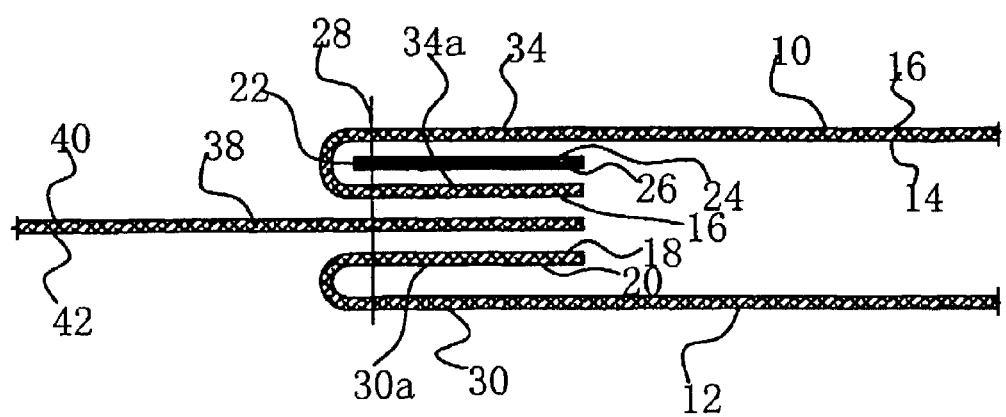
FIGS. 4A–4B are a cross-sectional view of a shoulder seam according to embodiments of the invention.
Figure 4B:
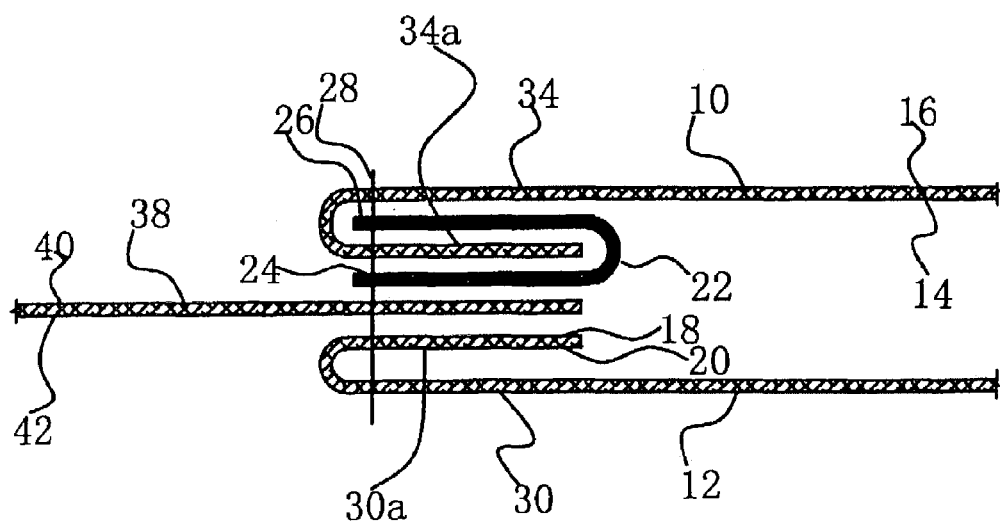

FIGS. 4A–4B are a cross-sectional view of a shoulder seam according to embodiments of the invention. FIG. 4A depicts one embodiment for the yoke seam. The components are arranged as in FIG. 3B, but before the stitch 28 is sewn, the second garment component 12 is reverse folded such that the lower surface 20 abuts itself. The stitch 28 is then sewn along a seam line along a side of the bonding element 22. The stitch 28 is preferably a top stitch that is made through the folded over portion 34 of the first garment component 10, the bonding element 22, the third garment component 40, the second garment component 12, and the folded over portion 30 of the second garment component. Heat and/or pressure are applied as described above to complete the manufacture of the seam. The adhesive of the bonding element 22 melts and flows over the surfaces of the folded portion 34 and the upper surface 14 of the first garment component 10. The folded portion 34 is the visible portion of the seams. Preferably, the adhesive of the bonding element 22 melts to bond the first garment component 10 and the stitch 28.

An alternative embodiment is illustrated in FIG. 4B. This embodiment is similar to the one shown in FIG. 3C, except that the garment component 12 is reverse folded. As shown in FIG. 4B, the edge portion 34a of the garment component 10 is sandwiched between two portions of the upper surface 24 of the bonding element 22. As such, both the upper surface 14 and the lower surface 16 of the garment component 10 in the edge portion 34a abut the upper surface 24 (which can also be viewed as the inner surface of the bonding element 22), while a portion of the lower surface 26 (which can also be viewed as the outer surface of the bonding element 22) abuts the upper surface 14 of the garment component 10 in the folded portion 34, and the another portion of the lower surface 26 of the bonding element 22 abuts the upper surface 40 of the garment component 38. Optionally, another bonding element (not shown) is placed around the edge portion of the garment component 12 in the same way as the bonding element 22 is place around the edge portion of the garment component 10. Alternatively, a substantially planar bonding element (not shown) is placed between the garment component 12 and the garment component 38 to abut both the lower surface of the garment component 38 and the upper surface of the edge portion of the garment component 12.

Figure 5A:
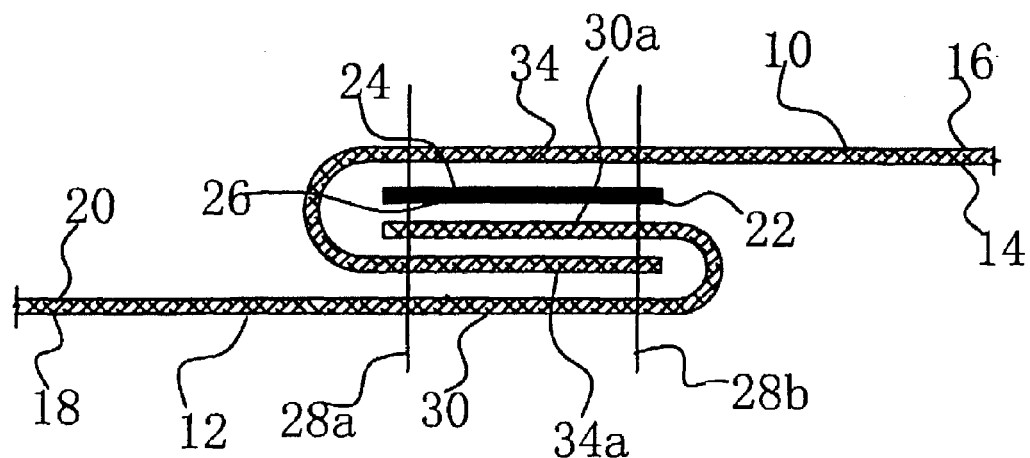
FIGS. 5A–5B are a cross-sectional view of a side seam according to embodiments of the invention.
Figure 5B:
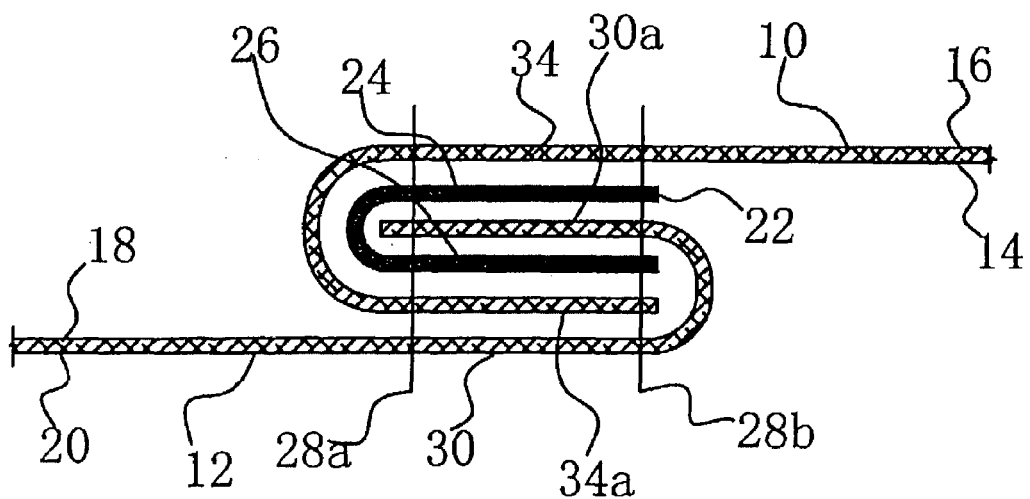

FIGS. 5A–5B are a cross-sectional view of a side seam according to embodiments of the invention. FIG. 5A depicts a cross sectional view of a side seam. The first garment component 10 is a back panel 104 and the second garment component is a front panel 102. The first garment component 10, the second garment component 12 and the bonding element 22 are positioned as shown in FIG. 2A. The second garment component 12 is reverse folded such that the lower surface 20 is adjacent to the lower surface 16 of the first garment component. Similarly, the first garment component 10 is folded over the bonding element 22 such that the upper surface 14 of the first garment component is adjacent to the upper surface 24 of the bonding element 22. The upper surface 18 of the garment component 12 in the edge portion 30a butts the lower surface 26 of the bonding element 22. The lower surface 20 of the garment component 12 in the edge portion 30a abuts the upper surface 14 of the garment component 10 in the edge portion 34a. At least one stitch 28 is sewn along a seam line defined by the first garment component 10 and second garment component 12. Preferably, the seam line is along a side of the bonding element 22. In one embodiment, a first stitch 28a is sewn along a seam line on a side of the bonding element 22 and a second stitch 28b is sewn along a seam line on an opposite side of the bonding element 22. The first stitch 28a and second stitch 28b are preferably double needle set sleeve stitches. The stitches 28 are made through all surfaces, including the folded over portion 34, the bonding element 22, the second garment component 12, the first garment component 10, and the folded over portion 30. The seam is continued along the inside of the shirt sleeve 106. Heat and/or pressure are applied as described above to complete the manufacture of the seam. The bonding element 22 melts and flows over folded portion 34 and the upper surface 14 of the first garment component 12. An alternative embodiment is shown in FIG. 5B which can be constructed in a way similar to the seam of FIG. 2D.

Figure 6A:
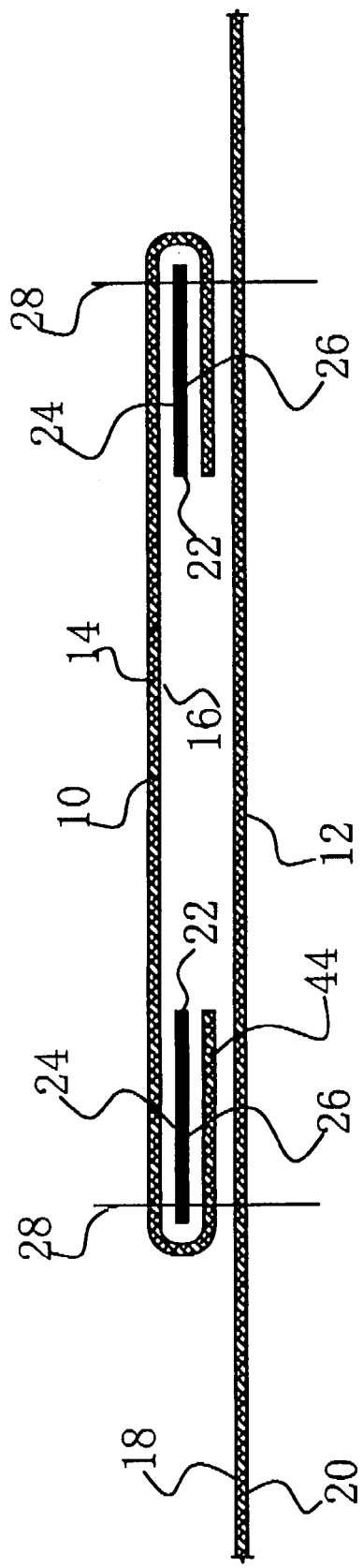
FIGS. 6A–6B are a cross-sectional view of a pocket seam according to embodiments of the invention.
Figure 6B:
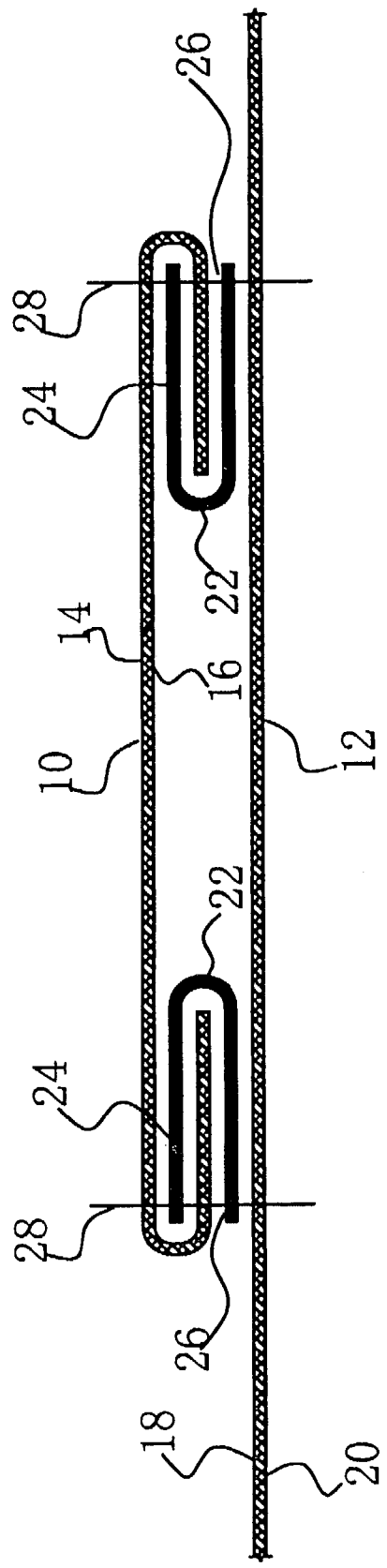

FIGS. 6A–6B are a cross-sectional view of a pocket seam according to embodiments of the invention. FIG. 6A depicts a cross sectional view of a pocket seam. The first garment component 10 is a pocket 114 and the second garment component 12 is a front panel 102. The pocket has two substantially parallel side edges and a bottom portion. The bonding element 22 is preferably laid on the upper surface 18 of the second garment component 12 in substantially the shape of the first garment component 10. The first garment component 10 is reverse folded over the bonding element 22, including the parallel side edges and the bottom portion. The lower surface 16 of the first garment component 10 surrounds the bonding element 22. The upper surface 14 of the first garment component abuts the upper surface 18 of the second garment component. A stitch 28 is sewn along the edge of the pocket, going through the upper surface 14 of the first garment component 10, the bonding element 22, the folded over portion 44 of the first garment 10, and the second garment component 12. Heat and/or pressure are applied as described above to complete the manufacture of the seam. The adhesive of bonding element 22 melts and flows over the lower surface 16 of the first garment component 10 that surrounds the bonding element 22 and the stitch 28. The folded portions 44 of the garment are visible at the pocket seam. Preferably, the adhesive of the bonding element 22 melts and flows over the entire folded portion 44.

In an alternative embodiment shown in FIG. 6B, the edge portion of the garment component 10 is reverse folded once. A bonding element 22 having an upper surface 24 and a lower surface 26 is folded around the reverse folded edge portion of the garment component 10. The lower surface 26 of the bonding element 22 abuts both the upper surface 14 and the lower surface 16 of the garment component 10 in the reverse folded edge portion. The upper surface 24 of the bonding element 22 abuts the upper surface 18 of the garment component 12 and the lower surface 16 of the garment component 10.

Figure 7A:
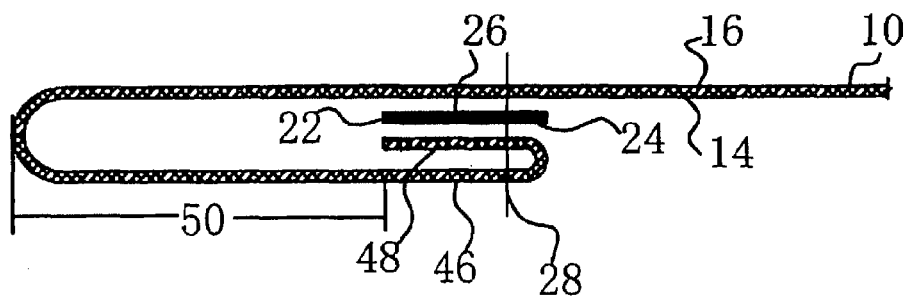
FIGS. 7A–7B are a cross-sectional view of a right front hem button stay seam according to embodiments of the invention.
Figure 7B:
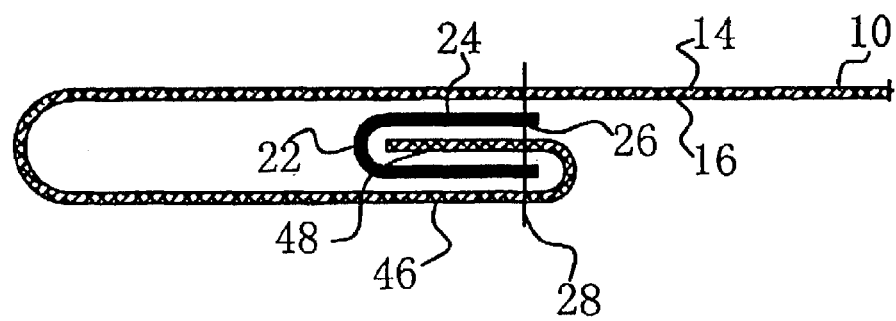

FIGS. 7A–7B are a cross-sectional view of a right front hem button stay seam according to embodiments of the invention. FIG. 7A depicts a cross sectional view of a right front hem button stay seam. There is a first garment component 10 which is a front panel 102. The upper surface 14 of the first garment component 10 is adjacent to the lower surface 26 of the bonding element 22. The first garment component 10 is folded over to have a first portion 46 which is then again folded such that a second portion 48 is adjacent to the upper surface 24 of the bonding element 22. A stitch 28 is sewn through the first portion 46, the second portion 48, the bonding element 22, and the first garment component 10. In one embodiment, the stitch is a single needle stitch. In an alternate embodiment, a double needle stitch is used. The distance 50 is the unfolded portion of the garment where buttons of the dress shirt are attached. Heat and/or pressure are applied as described above to complete the manufacture of the seam. It is important to have the adhesive of the bonding element 22 melt and flow over the entire surface of the seam width. This ensures complete bonding of the upper surface 14 and the first portion 46 to the bonding element 22.

In an alternative embodiment shown in FIG. 7B, a single garment component 10 comprises a first reverse folded portion 46, a second reverse folded portion 48, and an unfolded portion (which is above the bonding element 22). The second reverse folded portion 48 is surrounded by a bonding element 22 in once-folded configuration. The upper surface 26 (also the inner surface) of the bonding element 22 abuts both the upper surface 14 and the lower surface 16 of the garment component 10 in the second reverse folded portion 48. Moreover, the lower surface 16 in the first reversed folded portion 46 of the garment component 10 abuts a portion of the lower surface 24 (also as the outer surface) of the bonding element 22, while the lower surface 16 in the unfolded portion of the garment 10 abuts another portion of the lower surface 24 of the bonding element 22. An area is provided for attaching buttons, if desired.

Figure 8A:
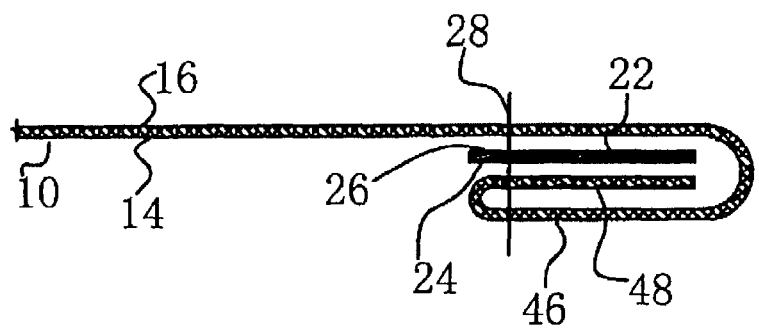
FIGS. 8A–8B are a cross-sectional view of a hem bottom seam according to embodiments of the invention.
Figure 8B:
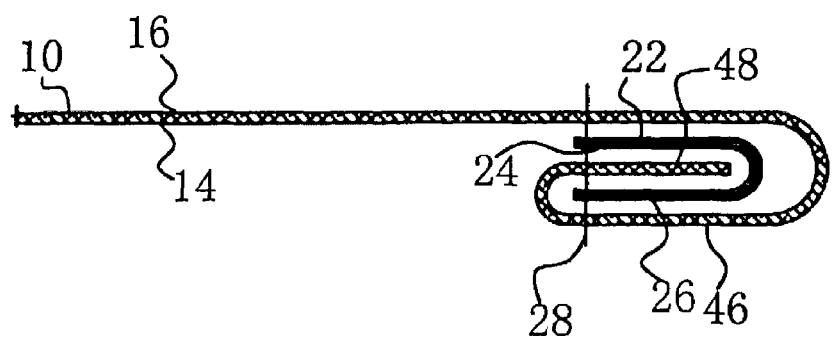

FIGS. 8A–8B are a cross-sectional view of a hem bottom seam according to embodiments of the invention. A hem bottom seam is shown in FIG. 8A. The same folds are performed as in FIG. 7, except the distance 50 is minimized since no buttons need to be sewn in this area. The stitch 28 is a top stitch sewn through the folded portion 46, the twice folded portion 48, the bonding element 22, and the first garment component 10. Heat and/or pressure are applied as described above to complete the manufacture of the seam. The hem bottom seam is stitched any place where a clean edge is required. An alternative embodiment is illustrated in FIG. 8B which can be constructed in a way similar to the seam of FIG. 7B, except that no button area is generally necessary.

Figure 9A:
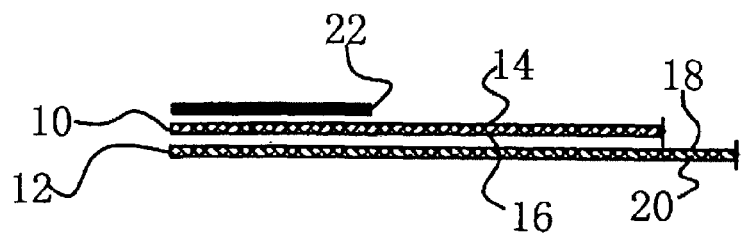
FIGS. 9A–9C are a cross-sectional view of a sleeve placket slit seam at various manufacturing stages according to embodiments of the invention.
Figure 9B:
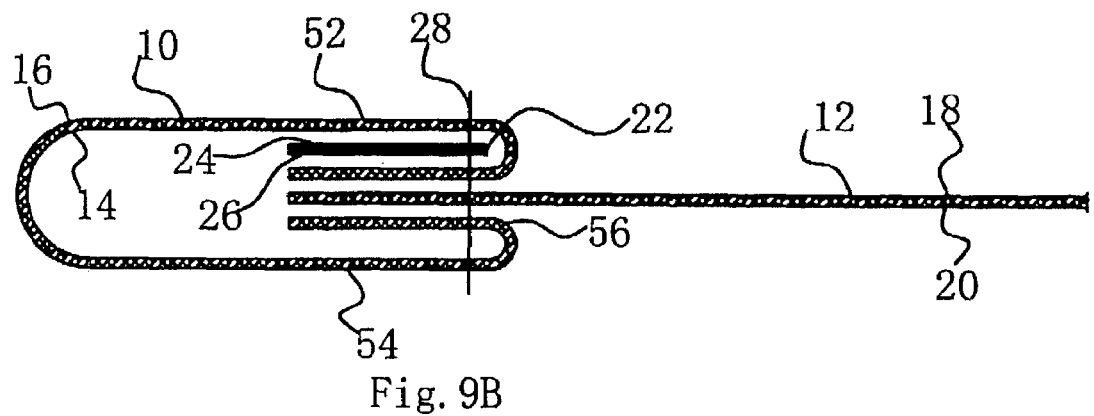
Figure 9C:
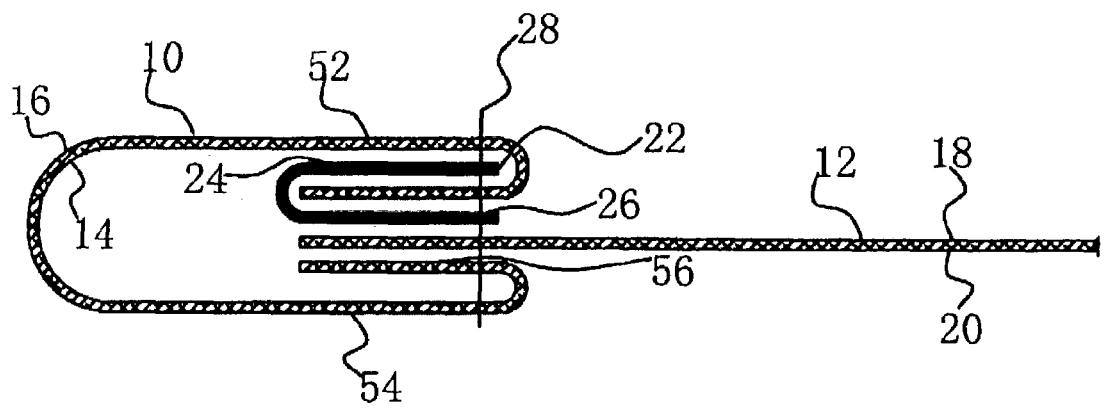

FIGS. 9A–9C are a cross-sectional view of a sleeve placket slit seam at various manufacturing stages according to embodiments of the invention. One method to form a completed sleeve placket seam is shown in FIGS. 9A–9B. The first garment component 10 is a shirt sleeve placket 116 and the second garment component 12 is a shirt sleeve 106. The bonding element 22, the first garment component 10, and the second garment component 12 are substantially aligned as shown in FIG. 9A. The first garment component 10 is folded over the bonding element 22 such that the upper surface 14 is adjacent to both the upper surface 24 and lower surface 26 of the bonding element. The folded portion 52 is then folded and reverse folded such that the lower surface 16 of the first garment component 10 is adjacent to the lower surface 20 of the second garment component 12, as shown in FIG. 9B. A stitch 28 is sewn through the folded portion 52, the bonding element 22, the second garment component 12, a reverse folded portion 54 and a folded portion 56. The stitch 28 is preferably a single needle set sleeve stitch. In an alternate embodiment, a double stitch is utilized. In another alternate embodiment, a set stitch is used to initially join the first garment component 10, the second garment component 12 and the bonding element 22 before any folding is performed. Heat and/or pressure are applied as described above to complete the manufacture of the seam. The first folded portion 52 is the visible portion of the sleeve placket 116. The sleeve placket is also attached to the sleeve cuff 118. The adhesive of the bonding element 22 preferably melts and flows along the entire folded portion 52 and the upper surface 14 of the first garment component 10 that it is adjacent to.

FIG. 9C shows another embodiment which utilizes one or more bonding elements 22 in a folded configuration. This seam has a similar structure to the one in FIG. 4B, except that (1) the garment component 10 and the garment component 12 of FIG. 4B become the same garment component 10 in FIG. 9C; and (2) the garment component 38 of FIG. 4B is the garment component 12 in FIG. 9C. As such, the lower surface 16 of the garment component 10 in the folded portion 56 abuts the lower surface 20 of the garment component 12. The inner surface 26 of the bonding element 22 abuts both the upper surface 14 and the lower surface 16 of the garment component 10. A portion of the outer surface 24 abuts the upper surface 14 of the garment component 10 in the folded portion 52, while another portion of the outer surface 24 abuts the upper surface 18 of the garment component 12. Similar to FIG. 4B, another bonding element (not shown) can be optionally placed around the folded portion 56 in the same way as the bonding element 22 is placed around the edge portion. Alternatively, a substantially planar bonding element (not shown) can be placed between the garment component 12 and the folded portion 56 to abut the upper surface of the folded portion 56 and the lower surface of the garment component 12.

Figure 10A:
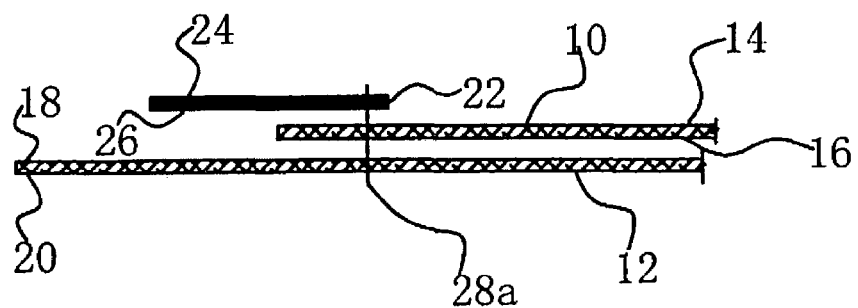
FIGS. 10A–10E are a cross-sectional view of a shirt armhole seam at various manufacturing stages according alternative embodiments of the invention.
Figure 10B:
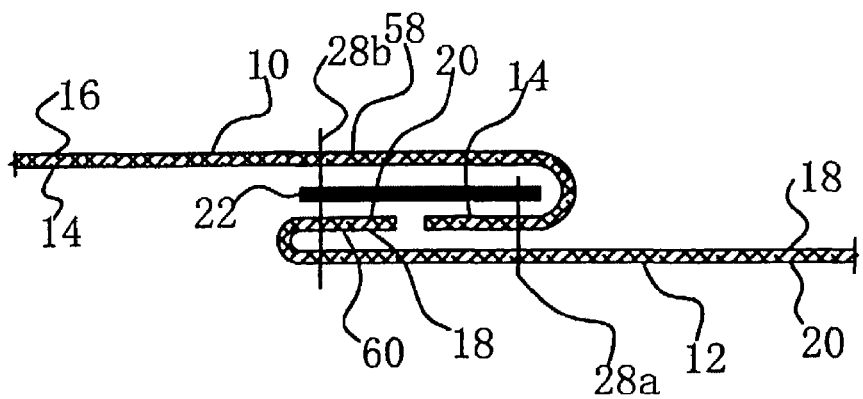
Figure 10C:
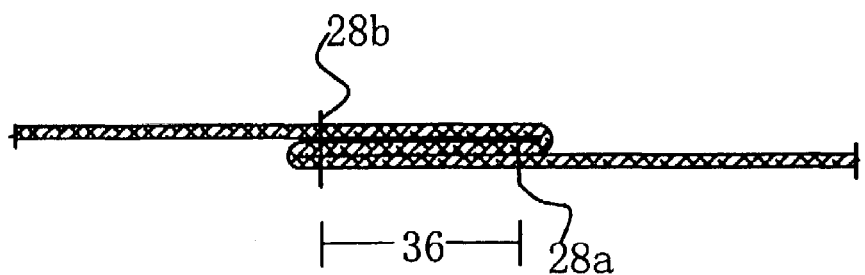

FIGS. 10A–10E are a cross-sectional view of a shirt armhole seam at various manufacturing stages according alternative embodiments of the invention. One alternate embodiment for manufacturing an armhole seam is shown in FIGS. 10A–10C. The first garment component 10 is a front panel 102, shirt yoke 112, or back panel 104. The second garment component 12 is a shirt sleeve 106. After the first garment component 10, second garment component 12 and the bonding element 22 are positioned as shown in FIG. 10A, a first stitch 28a is sewn along the seam line defined by the first and second garment components. The first stitch 28a is a needle set sleeve stitch. The first stitch 28a is sewn through the bonding element 22, the first garment component 10 and the second garment component 12. After the stitch 28a is sewn, the first garment component 10 is folded over the bonding element 22 such that the upper surface 14 is adjacent to the upper surface 24 of the bonding element 22. The second garment component 12 is folded such that the lower surface 20 is adjacent to the lower surface 26 of the bonding element 22 and the upper surface 18 abuts itself. A second stitch 28b is sewn to attach the folded portion 58, the bonding element 22, the second garment component 12 and the folded portion 60 of the second garment component 12. Heat and/or pressure are applied as described above to complete the manufacture of the seam. The distance 36 between stitches 28a and 28b is the seam width. The folded portion 58 is the visible portion of the armhole seam. Preferably, for optimal prevention of wrinkle it is important to have the adhesive of the bonding element 22 flow over the entire seam width 36. This ensures complete bonding of the folded portion 58 of the first garment component 10 to the upper surface 20 of the second garment component which abuts the lower surface 26 of the bonding element 22.

Figure 10D:
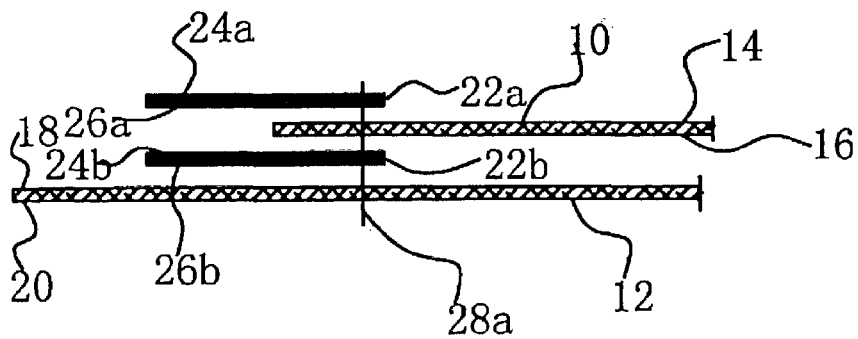
Figure 10E:
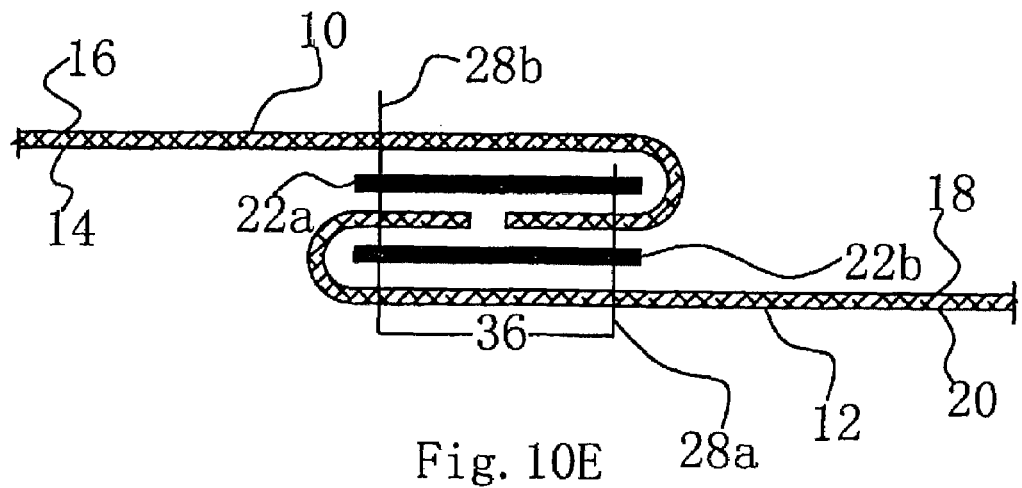

In an alternate embodiment, depicted in FIGS. 10D–10E, there is a first bonding element 22a and a second bonding element 22b. The second bonding element 22b is placed between the first component 10 and the second component 12. After the first garment component 10, second garment component 12 and the bonding elements 22 are positioned as shown in FIG. 10D, a first stitch 28a is sewn along the seam line defined by the bonding element 22b and the second garment component. The first stitch 28a is a single needle set sleeve stitch. The first stitch 28a is sewn through the second bonding element 22b and the second garment component 12. After the stitch 28a is sewn, the first garment component 10 is folded over the first bonding element 22a such that the upper surface 14 is adjacent to the upper surface 24a of the first bonding element 22a. The second garment component 12 is folded such that the upper surface 18 is adjacent to the upper surface 24b of the second bonding element 22b and the lower surface 20 of the second component 12 is adjacent to the lower surface 26a of the first bonding element 22a. A second stitch 28b is sewn to attach the folded portion of the first garment component 10, the first bonding element 22a, the folded portion of the second garment component 12, the second bonding element 22b, and the second garment component 12. Heat and/or pressure are applied as described above to complete the manufacture of the seam. The distance 36 between stitches 28a and 28b is the seam width. Preferably, for optimal prevention of wrinkle it is important to have the adhesive of the bonding element 22 flow over the entire seam width 36. This ensures complete bonding of the folded portion of the first garment component 10 and the folded portion of the second garment component to the bonding elements 22a and 22b they are in contact with.

Figure 11A:
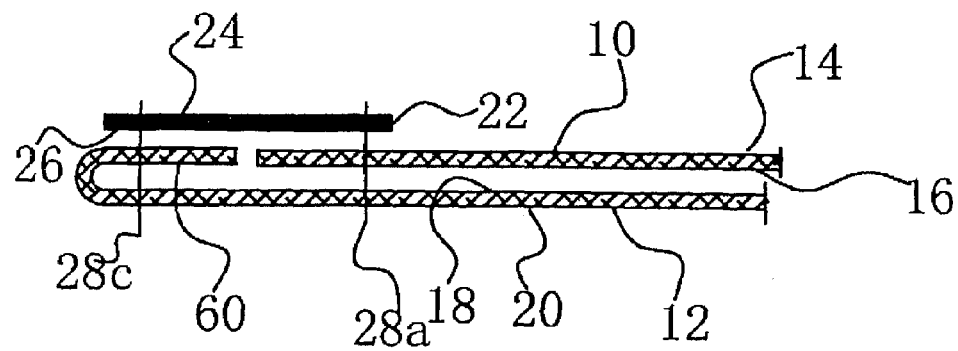
FIGS. 11A–11E are a cross-sectional view of a shirt armhole seam at various manufacturing stages according to still other embodiments of the invention.
Figure 11B:
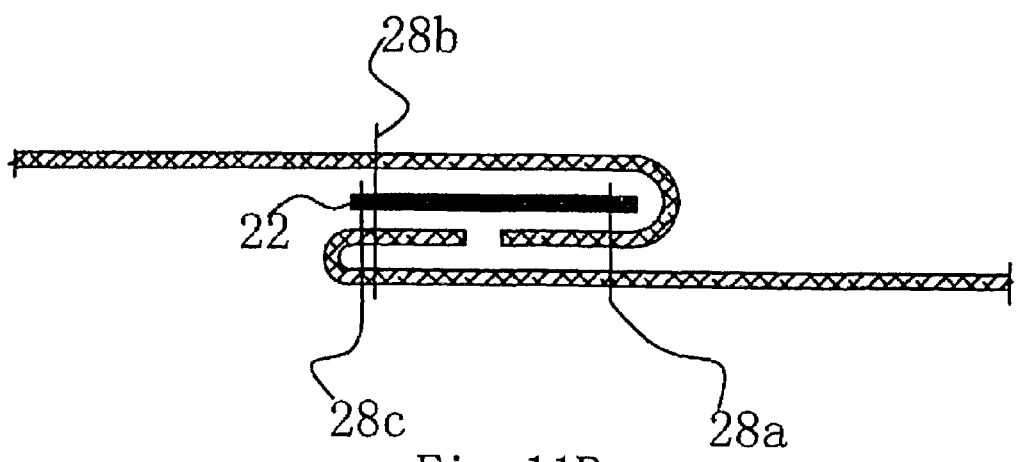
Figure 11C:
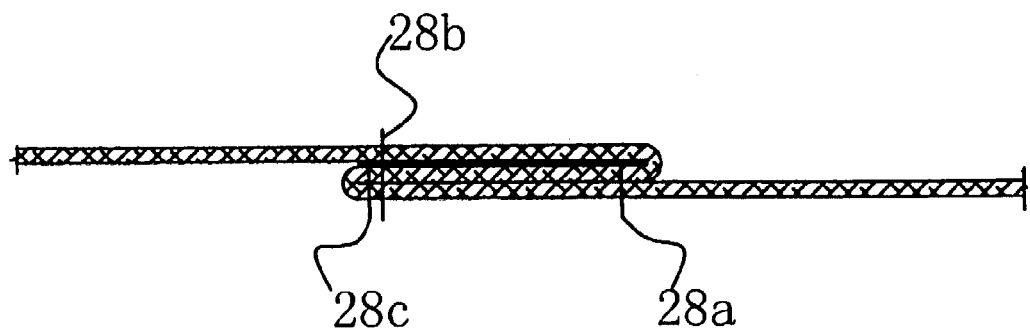

FIGS. 11A–11E are a cross-sectional view of a shirt armhole seam at various manufacturing stages according to still other embodiments of the invention. FIGS. 11A–11C show yet another alternate manufacturing method for an armhole seam. The same reference numerals as in FIGS. 10A–10C are used to depict similar seam components. The resulting seam in FIG. 11C utilizes a double needle set sleeve. The procedure steps are the same as for FIGS. 10A–10C, but an additional stitch is sewn. A third stitch 28c is sewn to attach the bonding element 22, the folded portion 60 of the second garment component 12 and the second garment component 12. The third stitch 28c is an additional needle set sleeve and provides for a double needle set sleeve. The third stitch 28c is optional and ensures that the bonding element 22 is properly aligned in the seam. Heat and/or pressure are applied as described above to complete the manufacture of the seam. In an alternative embodiments, the stitches 28a and 28c are double stitches. Moreover, the stitch 28b is optional.

Figure 11D:
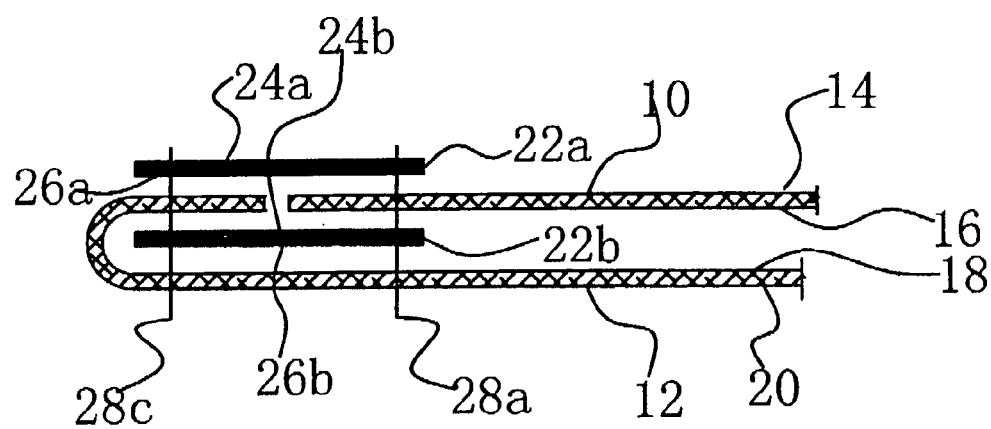
Figure 11E:
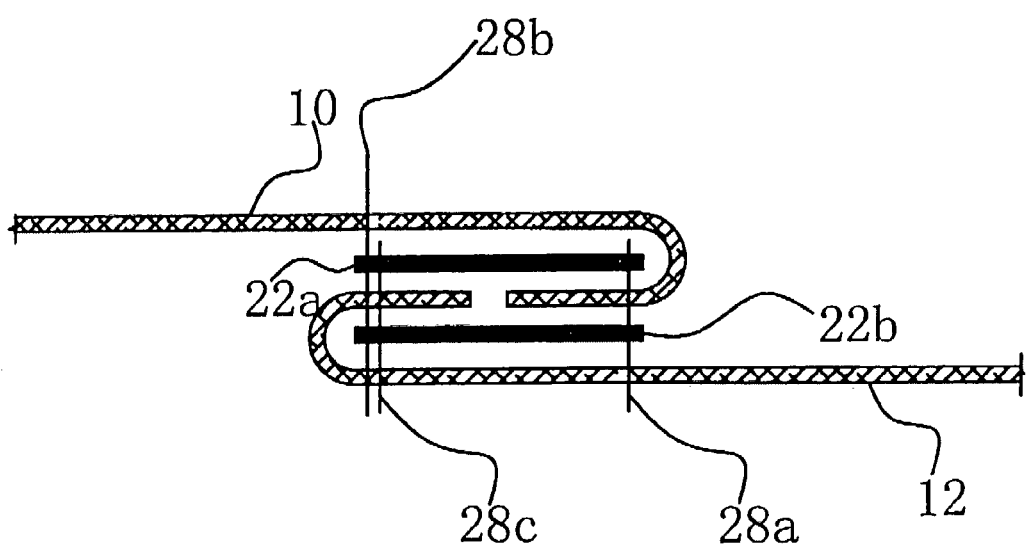

In an alternate embodiment, depicted in FIGS. 11D–11E, there is a first bonding element 22a and a second bonding element 22b. The second bonding element 22b is placed between the first component 10 and the second component 12. After the first garment component 10, second garment component 12 and the bonding elements 22 are positioned as shown in FIG. 11D, a set of stitches 28a and 28c are sewn along the seam line defined by the first and second garment components along both sides of the bonding elements 22. The stitches 28a and 28c are needle set sleeve stitches. The stitch 28a is sewn through the first bonding element 22a, the first garment component 10, the second bonding element 22b and the second garment component 12. The stitch 28c is sewn through the first bonding element, the folded portion of the second component, the second bonding element 22b, and the second garment component 12. After the stitches are sewn, the first garment component 10 is folded over the first bonding element 22a such that the upper surface 14 is adjacent to the upper surface 24a of the first bonding element 22a. A stitch 28b is sewn to attach the folded portion of the first garment component 10, the first bonding element 22a, the folded portion of the second garment component 12, the second bonding element 22b, and the second garment component 12. Heat and/or pressure are applied as described above to complete the manufacture of the seam. The distance 36 between stitches 28a and 28b is the seam width. Preferably, for optimal prevention of wrinkle it is important to have the adhesive of the bonding element 22 flow over the entire seam width 36. This ensures complete bonding of the folded portion of the first garment component 10 and the folded portion of the second garment component to the bonding elements 22a and 22b they are in contact with.

FIGS. 12A–12E are a cross-sectional view of a shirt collar seam at various manufacturing stages according to embodiments of the invention. FIGS. 12A–12D show one method of manufacturing a dress shirt collar seam. There is first garment component 10 which is a first collar component 108a and a second garment component 12 which is a second collar component 108b. There is also a bonding element 22 and an interlining 60. The interlining 60 preferably has an upper surface 62 and a lower surface 64. The interlining 60 is bonded to or abuts the upper surface 14 of the first garment component and extends toward, but stops short of the edge of the first garment component 10. After the first garment component 10, bonding element 22, interlining 60 and second garment component are arranged such as that shown in FIG. 12A, a first stitch 28e is sewn along the seam defined by the edges of the elements of the seam and through the bonding element 22, beyond an edge 66 of the interlining 60, through the first garment component 10 and the second garment component 12. The interlining 60 is recessed. Therefore, the first stitch 28e does not pass through the interlining 60. The first stitch 28e is a set stitch. Next, the bonding element 22 is reverse folded, around the stitch 28e such that the folded upper surface 24 of the bonding element 22 follows the unfolded upper surface 24 of the bonding element 22. The first garment component 10 is reverse folded at the stitch 28e such that the upper surface 62 of the interlining 60 is adjacent to the upper surface 24 of the bonding element 22. The second garment component 12 is reverse folded at the stitch 28e such that the lower surface 20 of the second garment component 12 is adjacent to the lower surface 20 of the second garment component 12. A second stitch 28f is sewn along the seam defined by the reverse folded portion of the first garment component 10, the interlining 60, the reverse folded portion of the bonding element 22, the bonding element 22, the first garment component 10 and the second garment component 12. The second stitch 28f is sewn through the reverse folded portion of the first garment component 10, the interlining 60, the reverse folded portion of the bonding element 22, the bonding element 22, the first garment component 10 and the second garment component 12. The second stitch 28f is preferably a top stitch. The top stitch is preferably a single needle stitch. In an alternate embodiment, a double stitch is used. Heat and/or pressure are applied as described above to complete the manufacture of the seam. It should be understood that in some seams, such as a collar seam, a bonding element (e.g., an adhesive tape) is not used.

Figure 12A:
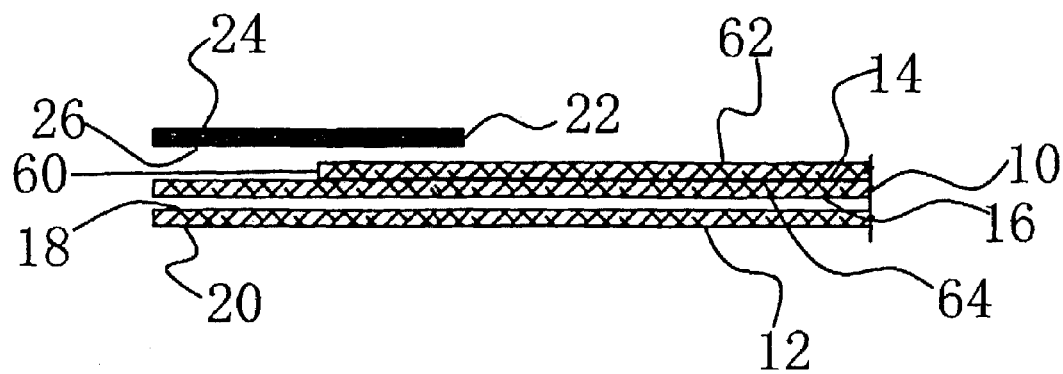
FIGS. 12A–12E are a cross-sectional view of a shirt collar seam at various manufacturing stages according to embodiments of the invention.
Figure 12B:
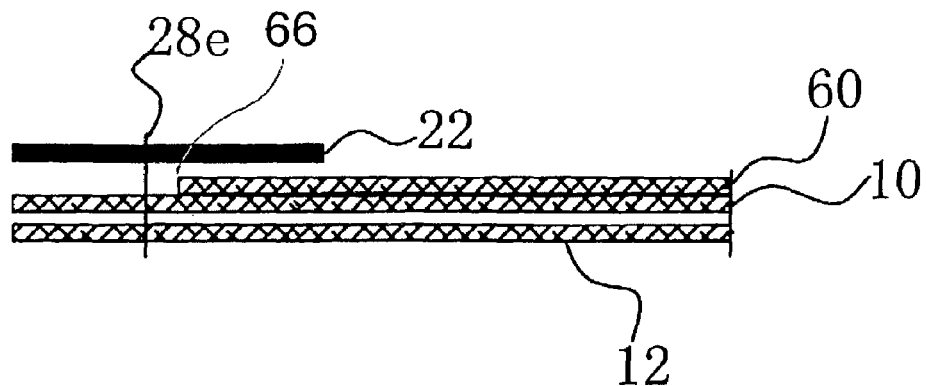
Figure 12C:
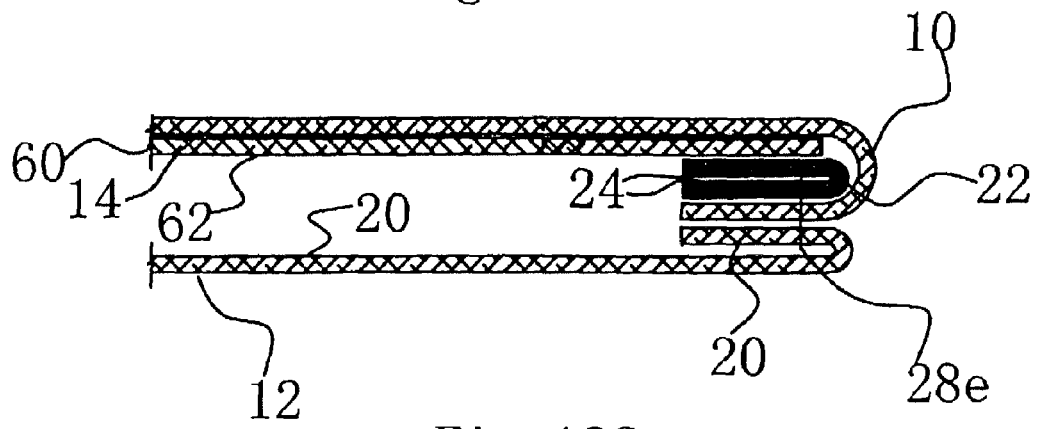
Figure 12D:
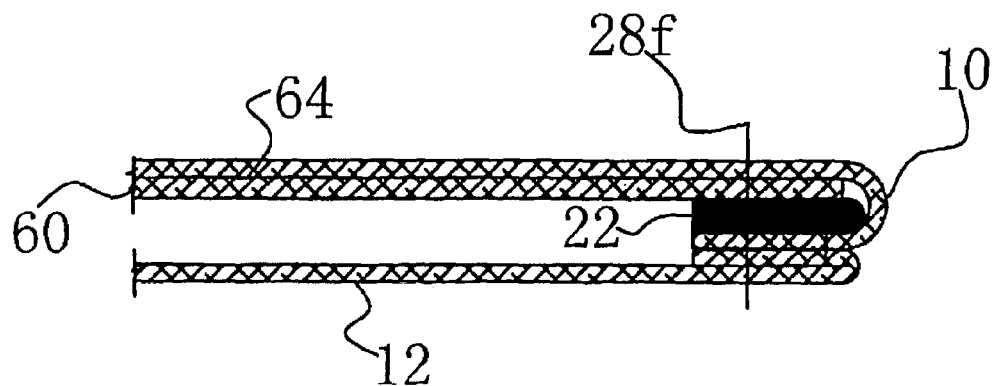
Figure 12E:
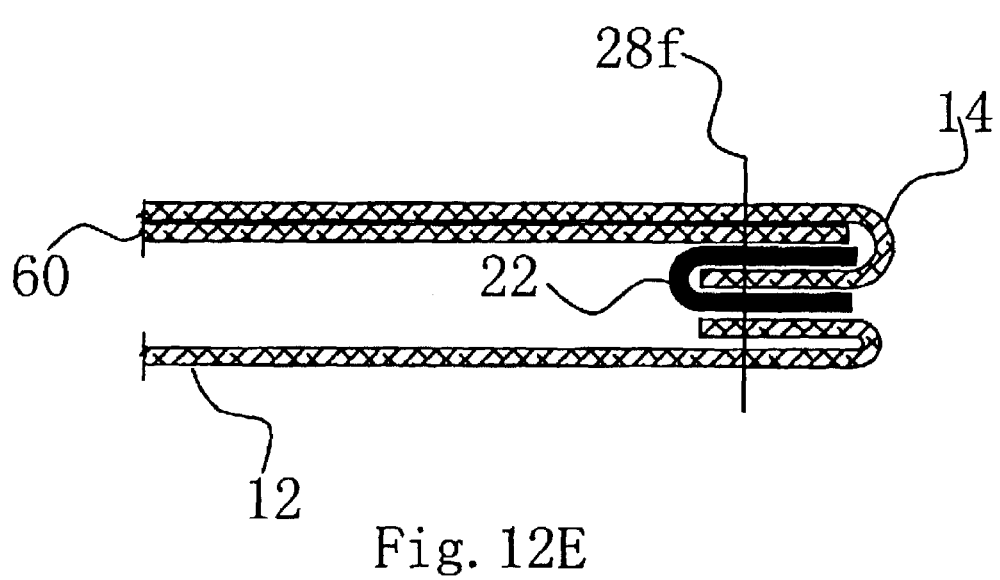

In an alternate embodiment, the bonding element 22 is folded such that the upper surface 24 of the bonding element 22 is adjacent to the lower surface 16 of the first component 10 and the upper surface 14 of the first component 10 as shown in FIG. 12E. The lower surface 26 of the bonding element 22 is adjacent to the interlining 60 and the upper surface 18 of the second component 12. The stitch 28F is sewn through the first component, the interlining, the bonding element, the folded portion of the first component, the bonding element, the folded portion of the second component and the second component. Heat and/or pressure are applied as described above to complete the manufacture of the seam.

In embodiments illustrated by FIGS. 2D, 3C, 4B, 5B, 6B, 7B, 8B, 9C, 10E, 11E, and 12F, suitable adhesive materials need not be limited to those with a hot pressing melting temperature of at least 160° C. Any adhesive materials may be used.

Interlinings are used to provide stiffness in collar components. The interlining is preferably a woven interlining made from cotton or a cotton/polyester blend. In an alternate embodiment, a nonwoven interlining body made from polyester, nylon, viscose or blends of these materials may be used. In another alternative embodiment, a thermal adhesive component may be applied to the first surface of the interlining, the second surface of the interlining, or both surfaces of the interlining. Preferably, the interlining is fabricated from a single material, although blends of two or more materials can also be used. As mentioned above, in some seams, such as a collar seam, an adhesive tape is not used.

As described above, one form of the bonding element 22 is an adhesive tape. But other forms or structures for the bonding element are possible. In an alternative embodiment, the bonding element 22 is an interlining having an adhesive coating on one or both outer surfaces. The adhesive is preferably one of the same thermal adhesives previously mentioned in the adhesive tape embodiments discussed above. The adhesive may be applied on the upper and/or lower surfaces of the interlining as an adhesive layer or as a series of adhesive dots. A quantity of adhesive sufficient to flow over the garment surfaces as described above is needed in order to provide complete bonding. The adhesive coating on the interlining can be replaced by a film of adhesive attached to one or both surfaces of the interlining.

In some embodiments, the bonding element 22 is folded such that the upper surface 24 of the bonding element 22 abuts itself and the lower surface 26 is the only surface available for thermally bonding with the garment components. Optionally, interlining 60 is placed above and/or beneath the bonding element 22. In other embodiments, the interlining 60 is folded such that the bonding element 22 is surrounded by the interlining 60. Optionally, the bonding element 22 is also folded.

As described above, the bonding element can be a substantially planar piece of adhesive tape which is first placed adjacent to one or more garment components. The substantially planar adhesive tape may subsequently be folded once into a substantially U-shape around an edge portion of a garment component. Alternatively, the bonding element can be first folded into a substantially U-shape and then be placed adjacent to one or more garment components. The bonding element may also be pre-made into a substantially U shape such that that the folding step is unnecessary. FIGS. 13–21 illustrate methods of making various seams by using a substantially U-shaped bonding element. In these embodiments, any adhesive materials can be used. Moreover, the bonding element need not be made entirely of an adhesive material. An interlining with an adhesive material coated on one or both surfaces of the interlining can be used. In some embodiments, adhesive webs or nets are used in place of or in addition to a solid adhesive tape.

Figure 13A:
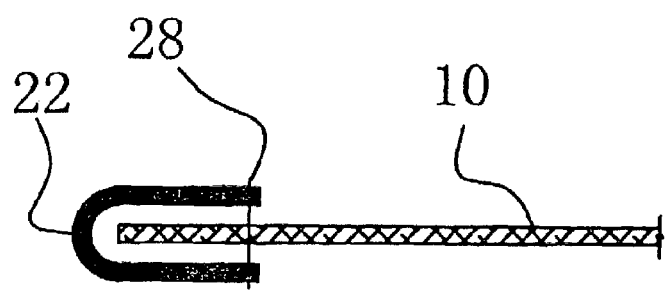

FIGS. 13A–13B show a cross-sectional view of a hem button stay seam made by an alternative method according to embodiments of the invention. The hem button stay seam of FIG. 13B is similar to the one shown in FIG. 7B, except that a single stitch 28 in FIG. 13B only traverses through the U-shaped bonding element 22 and the edge portion of the garment component 10, whereas a top stitch 28a traverses through the U-shaped bonding element 22 and the edge portion, once folded portion and twice folded portion of the garment component 10.

FIGS. 14A–14B show a cross-sectional view of a pocket seam made by an alternative method according to embodiments of the invention. The pocket seam of FIG. 14B is similar to the one shown in FIG. 6B, except that a single stitch 28 in FIG. 14B only traverses through the U-shaped bonding element 22 and the edge portion of the garment component 10, whereas a top stitch 28a traverses through the U-shaped bonding element 22 and the edge portion, once folded portion of the garment component 10 and the garment component 12.

Figure 15A:
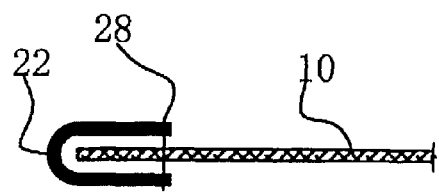
FIGS. 15A–15C show a cross-sectional view of a yoke seam made by an alternative method according to embodiments of the invention.
Figure 15B:
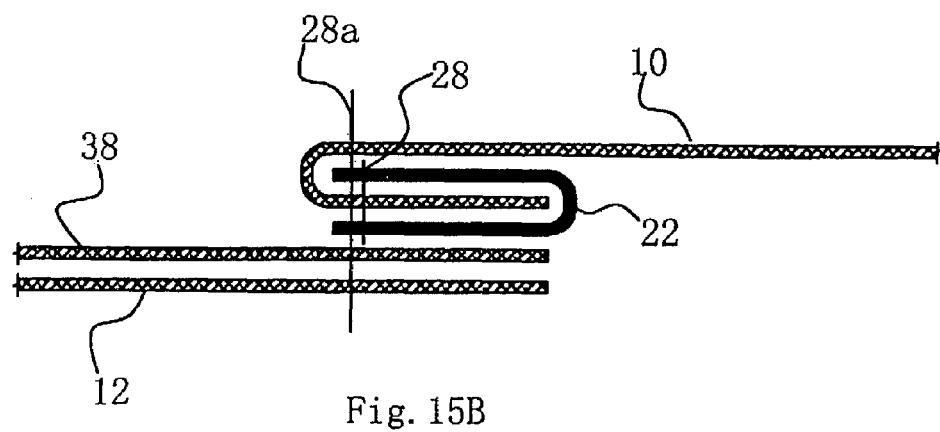
Figure 15C:
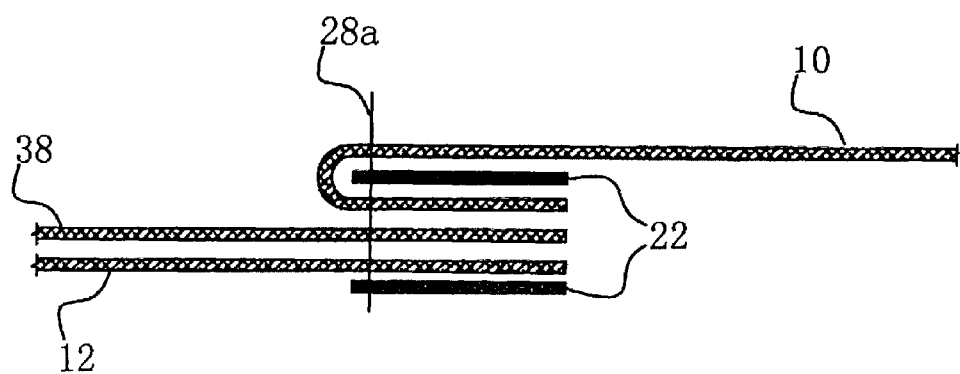

FIGS. 15A–15C show a cross-sectional view of a yoke seam made by an alternative method according to embodiments of the invention. The yoke seam of FIG. 15B is similar to the one shown in FIG. 3C, except that a single stitch 28 in FIG. 15B only traverses through the U-shaped bonding element 22 and the edge portion of the garment component 10, whereas a top stitch 28a traverses through the U-shaped bonding element 22 and the edge portion, once folded portion of the garment component 10, the third garment component 38, and the garment component 12. FIG. 15C shows yet another yoke seam but without using a U-shaped bonding element. Instead, two substantially planar adhesive tapes are used: one placed between the unfolded portion and the folded portion of the garment component 10; the other placed beneath the garment component 12.

Figure 16A:
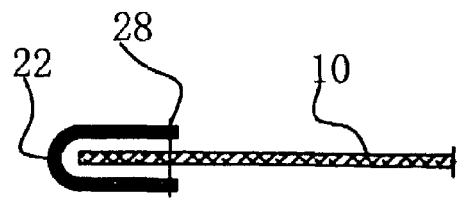
FIGS. 16A–16C show a cross-sectional view of a join shoulder seam made by an alternative method according to embodiments of the invention.
Figure 16B:
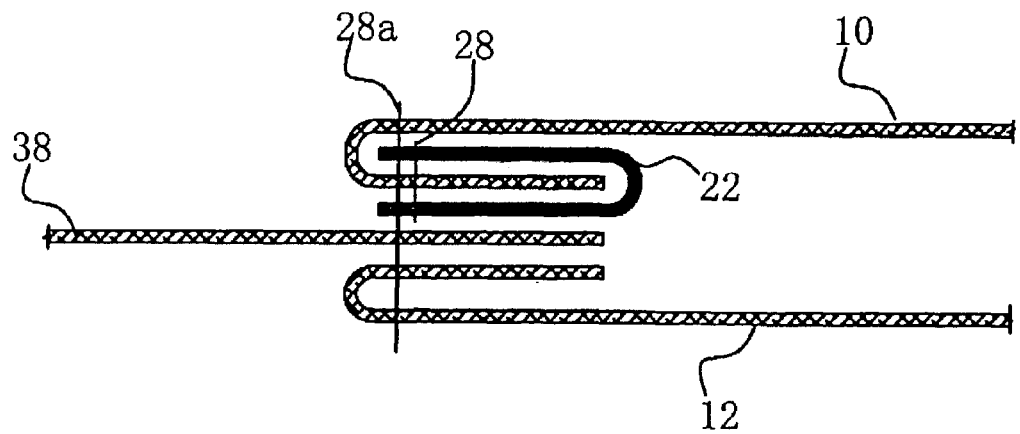
Figure 16C:
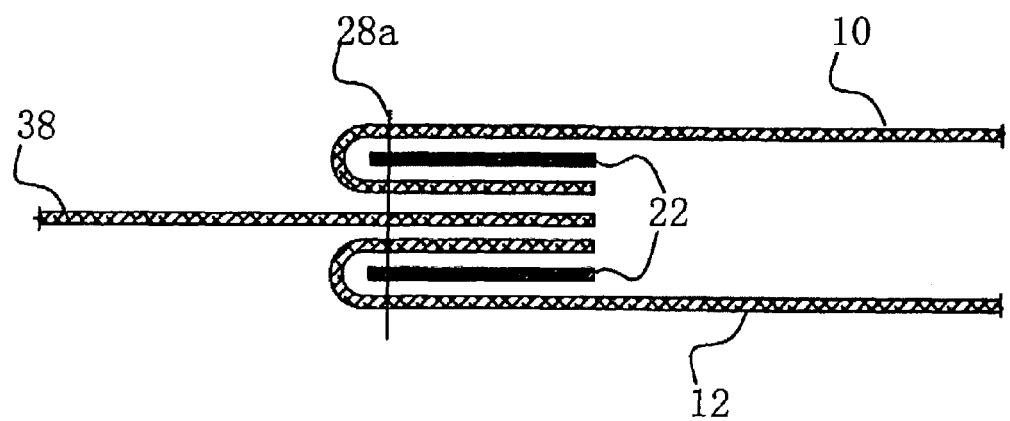

FIGS. 16A–16C show a cross-sectional view of a join shoulder seam made by an alternative method according to embodiments of the invention. The join should seam of FIG. 16B is similar to the one shown in FIG. 4B, except that a single stitch 28 in FIG. 16B only traverses through the U-shaped bonding element 22 and the edge portion of the garment component 10, whereas a top stitch 28a traverses through the U-shaped bonding element 22 and the edge portion, once folded portion of the garment component 10, the third garment component 38, and the garment component 12. FIG. 16C shows yet another yoke seam but without using a U-shaped bonding element. Instead, two substantially planar adhesive tapes are used: one placed between the unfolded portion and the folded portion of the garment component 10; the other placed between the unfolded portion and the folded portion of the garment component 12.

Figure 17A:
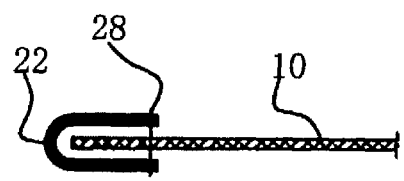
FIGS. 17A–17C show a cross-sectional view of a placket slit seam made by an alternative method according to embodiments of the invention.
Figure 17B:
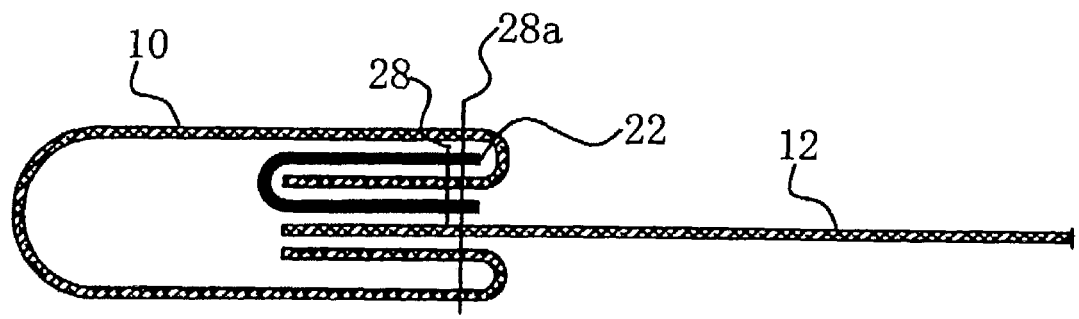
Figure 17C:
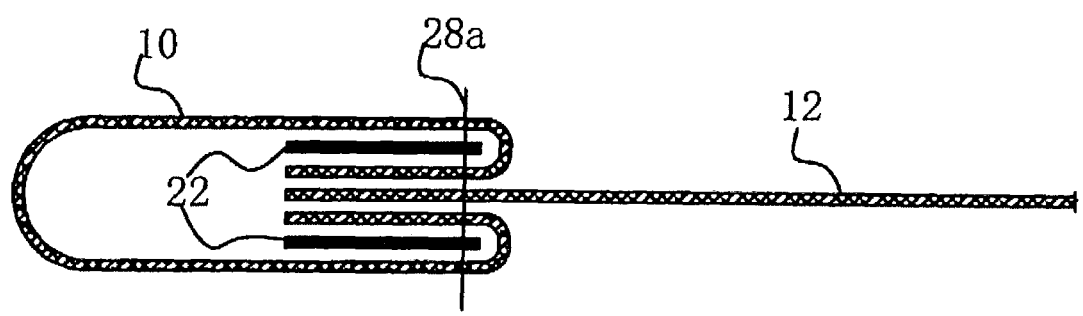

FIGS. 17A–17C show a cross-sectional view of a placket slit seam made by an alternative method according to embodiments of the invention. The placket slit seam of FIG. 17B is similar to the one shown in FIG. 9B, except that a single stitch 28 in FIG. 17B only traverses through the U-shaped bonding element 22 and the edge portion of the garment component 10, whereas a top stitch 28a traverses through the U-shaped bonding element 22 and the edge portion, the once folded portion, the twice folded portion, and thrice folded portion of the garment component 10, and the garment component 12. FIG. 17C shows yet another yoke seam but without using a U-shaped bonding element.

Instead, two substantially planar adhesive tapes are used: one placed between the unfolded portion and the once folded portion of the garment component 10; the other placed between the twice folded portion and the thrice folded portion of the garment component 10.

Figure 18A:
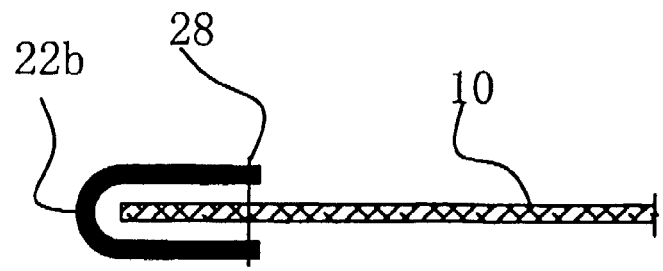
FIGS. 18A–18C show a cross-sectional view of a sleeve seam made by an alternative method according to embodiments of the invention.
Figure 18B:
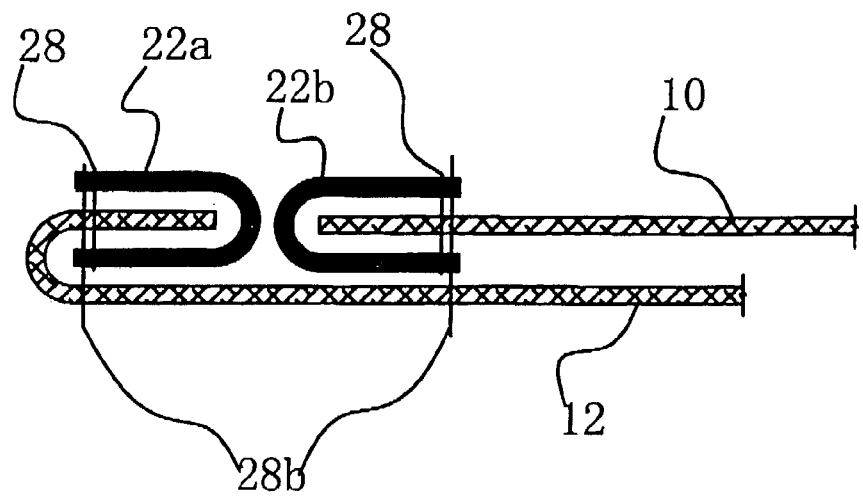
Figure 18C:
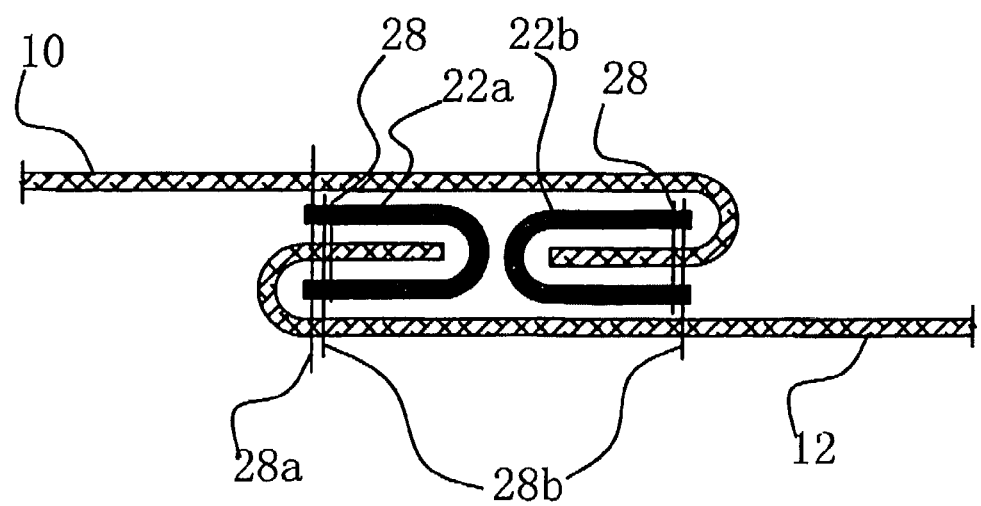

FIGS. 18A–18C show a cross-sectional view of a sleeve seam made by an alternative method according to embodiments of the invention. The sleeve seam of FIG. 18C is similar to the one shown in FIG. 10E, except that two U-shaped bonding elements 22a and 22b are used instead of two planar bonding elements. A single stitch 28 is sewn through the edge portion of the garment component 10 and the bonding element 22b. Similarly, another single stitch 28 is sewn through the edge portion of the garment component 12 and the bonding element 22a. Then the garment components 10 and 12 are placed adjacent to each other as shown in FIG. 18B. A double stitch 28b is sewn through the bonding elements 22a and 22b, the edge portion of the both garment components 10 and 12, and the folded portion of the garment component 12. Afterwards, the first garment 10 is folded as shown in FIG. 18C, and a single top stitch 28a is sewn through the folded portion of the garment component 10, the bonding element 22a, the edge portion and the folded portion of the garment component 12. Optionally, another top stitch may be sewn through the folded portion and the edge portion of the garment component 10, the bonding element 22b, and the folded portion of the garment component 12.

Figure 19A:
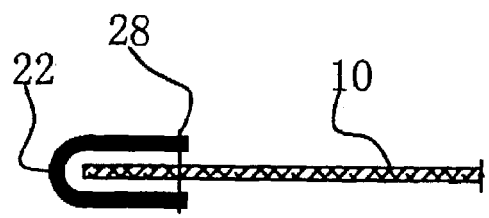
FIGS. 19A–19B show a cross-sectional view of a hem bottom seam made by an alternative method according to embodiments of the invention.
Figure 19B:
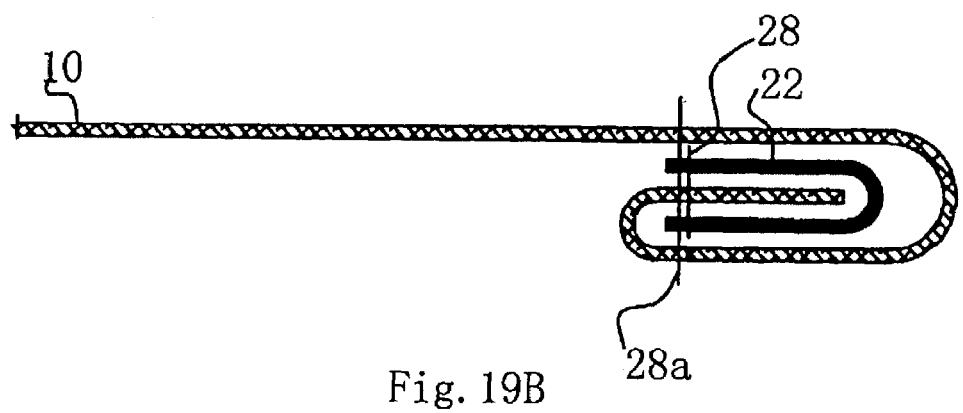

FIGS. 19A–19B show a cross-sectional view of a hem bottom seam made by an alternative method according to embodiments of the invention. The hem bottom seam is made similar to the hem button stay seam shown in FIGS. 13A–13B, except that there is no button area provided in the hem bottom seam.

Figure 20A:
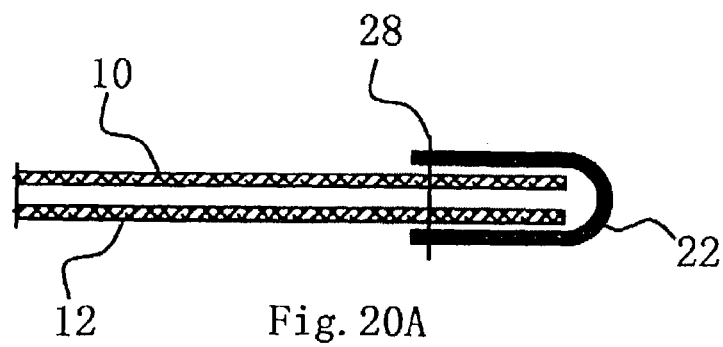
FIGS. 20A–20C show a cross-sectional view of a side seam with single need stitches made by an alternative method according to embodiments of the invention.
Figure 20B:
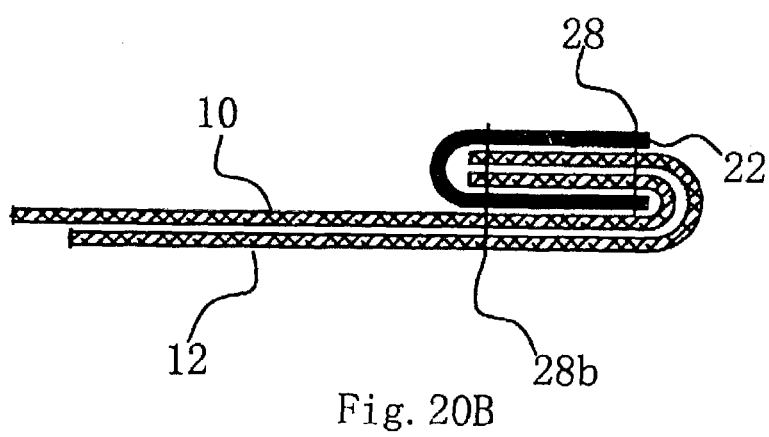
Figure 20C:
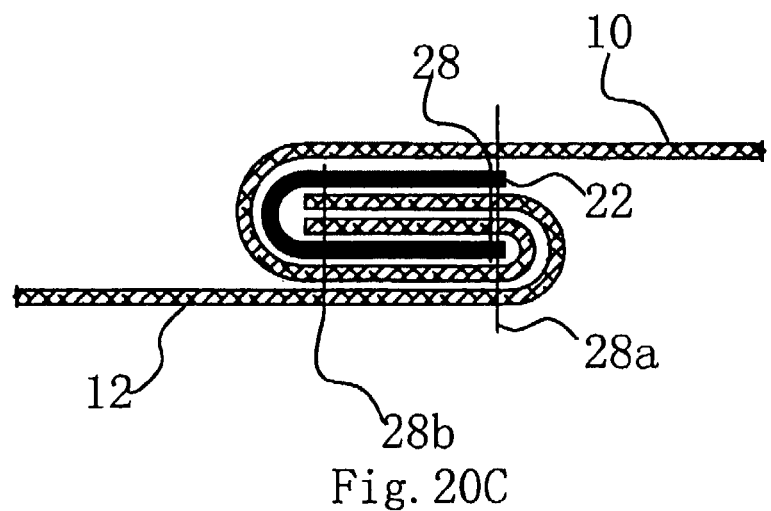

FIGS. 20A–20C show a cross-sectional view of a side seam with single need stitches made by an alternative method according to embodiments of the invention. Referring to FIG. 20A, two garment components 10 and 12 are placed over each other such that the lower surface of the garment component 10 is adjacent to the upper surface of the garment component 12. A U-shaped bonding element 22 is placed around the edge portions of the garment components 10 and 12 such that the inner surface of the bonding element 22 is adjacent to both the upper surface of the garment component 10 and the lower surface of the garment component 12. A single stitch is sewn through the bonding element 22, the edge portion of the garment component 10, and the edge portion of the garment component 12. Next, both garment components 10 and 12 are reverse folded once such that a portion of the outer surface of the bonding element is adjacent to the lower surface of the garment component 10 in the reverse folded portion as shown in FIG. 20B. Moreover, the upper surface of the garment component 10 is adjacent to the lower surface of the garment component 12 in the reverse folded portion. A single stitch 28b (located opposite to the stitch 22 across the seam) is sewn through the bonding element 22, both edge portions of the garment components 10 and 12, and both the reverse folded portions of the garment components 10 and 12. The reverse folded portion of the garment component 10 is reverse folded the second time such that the lower surface of the garment component 10 in the twice folded portion is adjacent to the remaining portion of the outer surface of the bonding element 22 as shown in FIG. 20C. Still another single stitch 28a (adjacent to the stitch 28) is sewn through the edge portion, the once reverse folded portion, and the twice reversed folded portion of the garment component 10, the edge portion and the once folded portion of the garment component 12, and the bonding element 22.

Figure 21A:
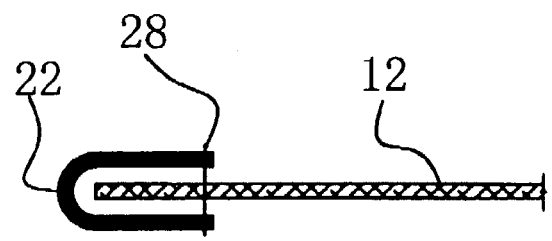
FIGS. 21A–21B show a cross-sectional view of a side seam with double needle stitches made by an alternative method according to embodiments of the invention.
Figure 21B:
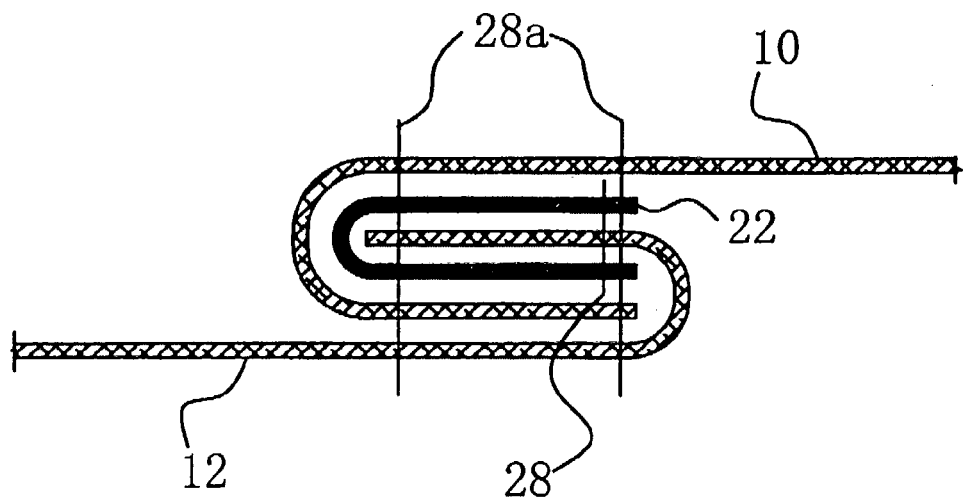

FIGS. 21A–21B show a cross-sectional view of a side seam with double needle stitches made by an alternative method according to embodiments of the invention. The side seam of FIG. 21B is similar to the one shown in FIG. 2D, except that a single stitch 28 in FIG. 21B is first sewn through the edge portion of the garment component 12 and the bonding element 22; then a double stitch 28a is sewn through the edge portion and the reversed folded portion of the garment component 10, the edge portion and the reversed folded portion of the garment component 12, and the bonding element 22.

While the above methods are described and illustrated as comprising a plurality of steps, some or all of these steps may be combined into a single step. Sometimes, the seams disclosed herein may be assembled and stitched in one single step or during one stage. This is achieved by using an attachment folder. An attachment folder is attached to a beam of a tailor machine. The way it is attached varies, depending on the type of the garment components to be sewn together. Any attachment folder or device can be used so long as it facilitates the placement of the bonding element between two garment components. The attachment folder also should allow the folding of the garment components to their desired styles. Finally, the attachment folder should facilitate the stitching the seam while keeping all the components in place. With the use of an attachment folder, the seam is formed in one single step, thereby eliminating or combining some steps described above. Specifically, if an attachment folder is used in making the seam of FIG. 2C, it would be unnecessary to go through the stages illustrated by FIG. 2A. Similarly, the stages illustrated in FIGS. 3A, 9A, 10A, 10D, 11A, 11D, and 12A–12B would be unnecessary if an attachment folder is used to make the seams of FIGS. 2C, 3B, 9B, 10C, 10E, 11C, 11E, 12D and 12F, respectively. For example, referring to FIG. 12, the attachment folder can be used to place the bonding element 22 on the garment components to form a smooth seam. The attachment folder is also used to guide the interlining 60 within garment components that utilize interlining 60. In the embodiments which utilizes an attachment folder, stitching is typically done by a set of double stitches, instead of two separate sets of single stitches made in sequential order. Specifically, referring to FIG. 2C, the stitches 28a and 28b (referred to as the first and second stitches in the above description) would be replaced by a single set of double stitches traversing through the entire seam if an attachment folder is used. This set of double stitches is made typically after the desired seam structure is prepared. Similarly, the two separate sets of stitches illustrated in FIGS. 5, 10, and 11 can be replaced by a single set of double stitches if an attachment folder is used. Such an attachment folder or device can be used in any embodiment of the invention if a seam is to be assembled and stitched in less steps.

Figure 23A:
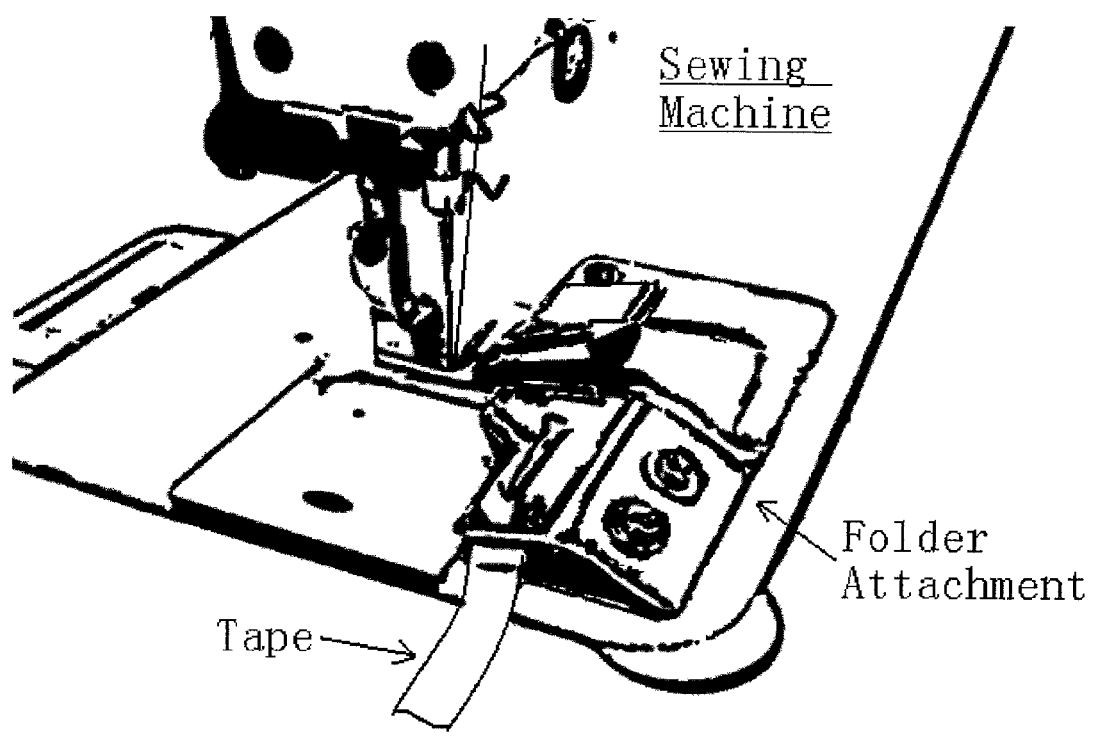
FIGS. 23A–23E show perspective views of an attachment folder used in connection with a sewing machine according to embodiments of the invention.
Figure 23B:
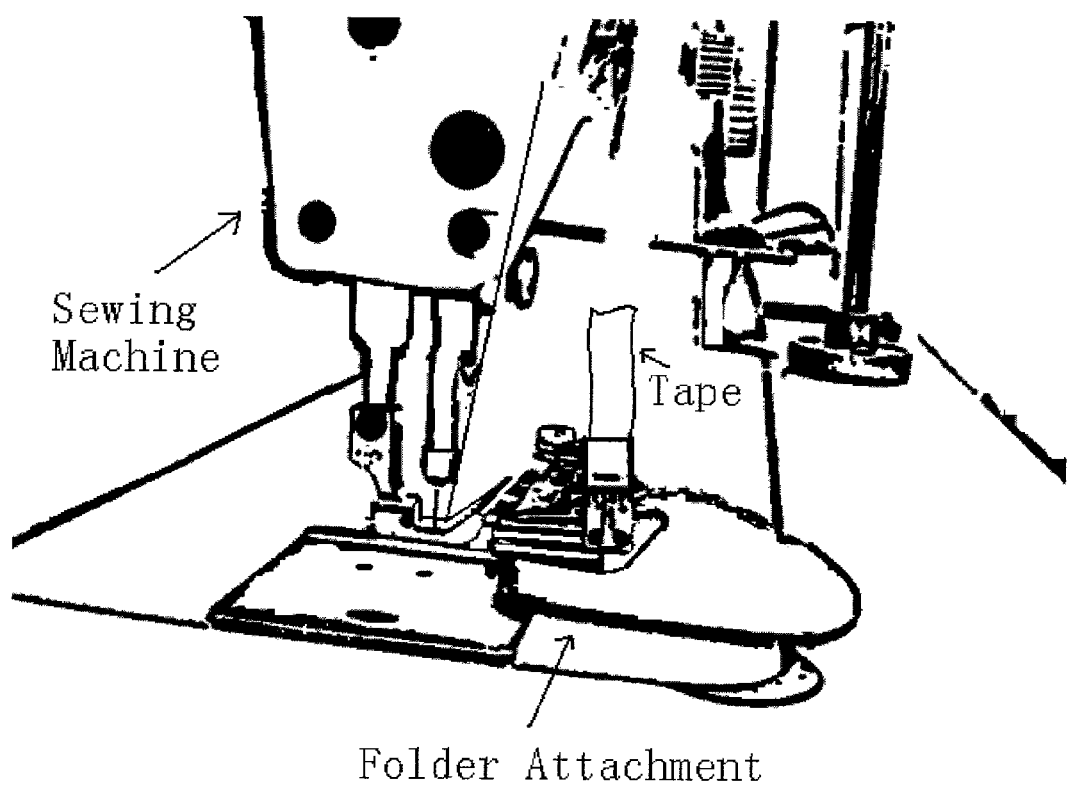
Figure 23C:
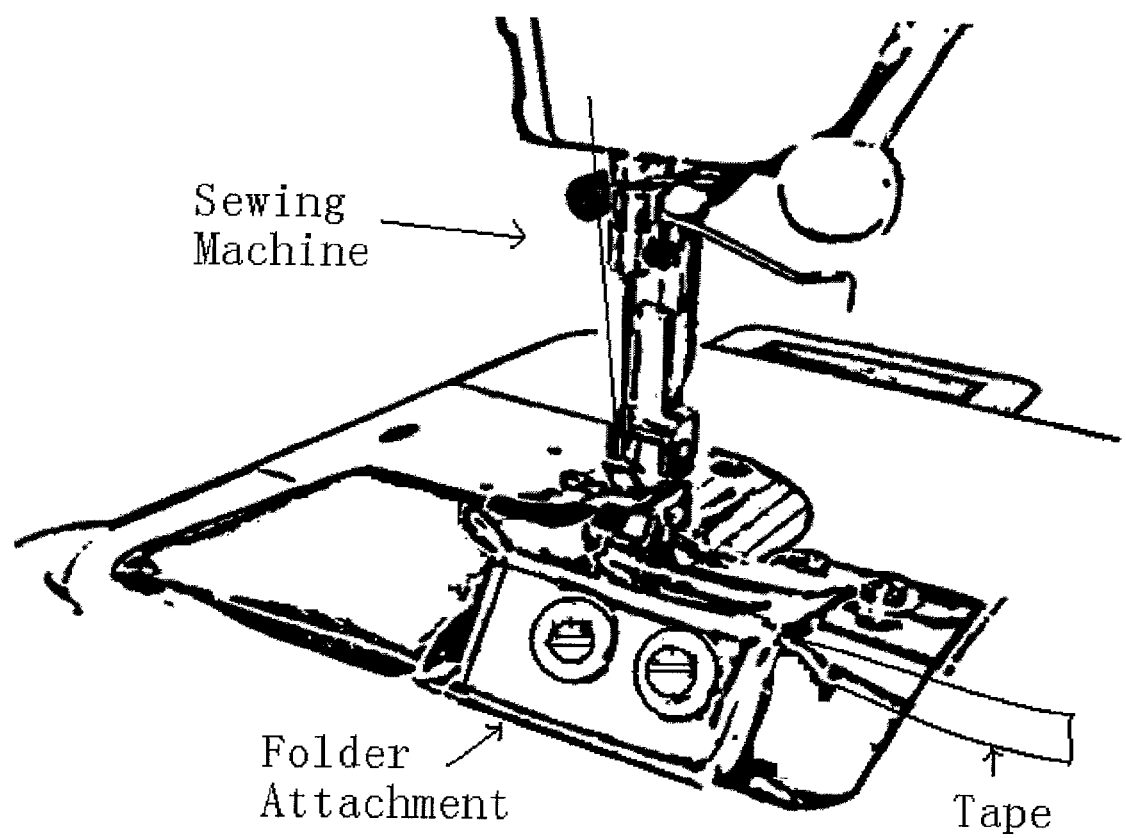
Figure 23D:
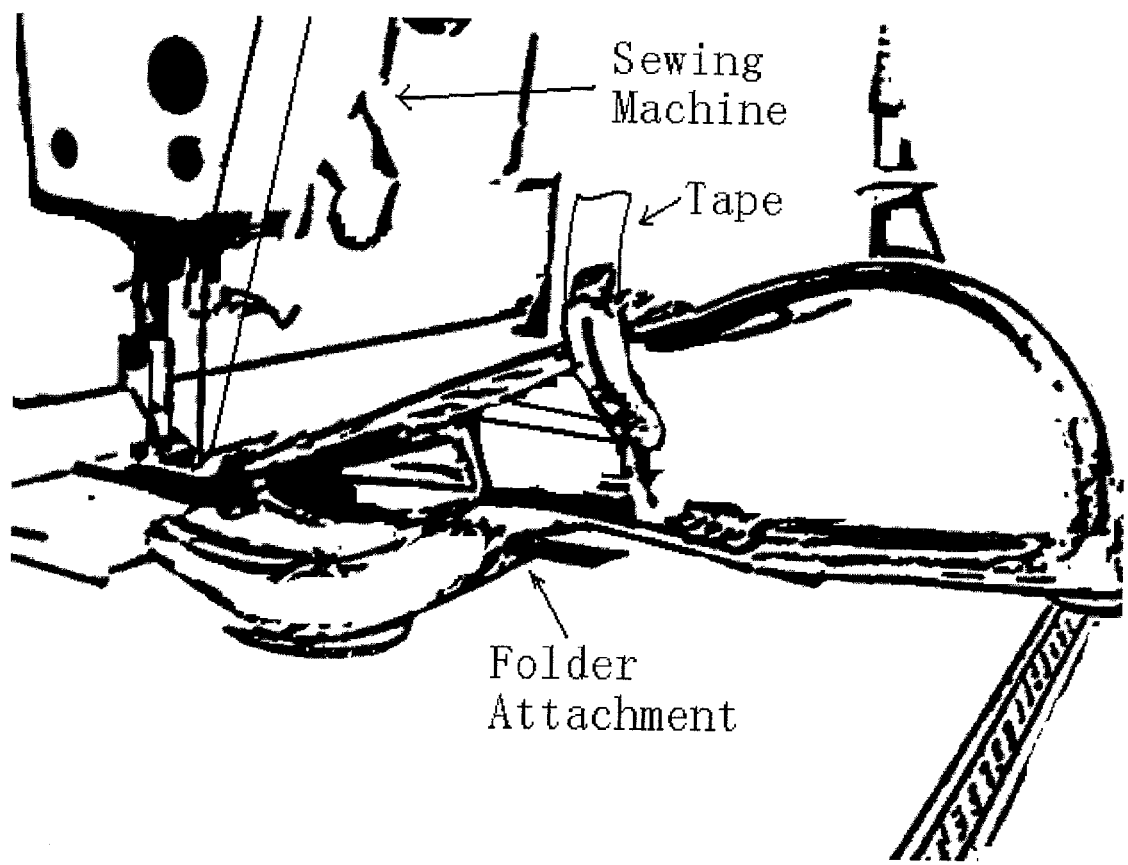
Figure 23E:
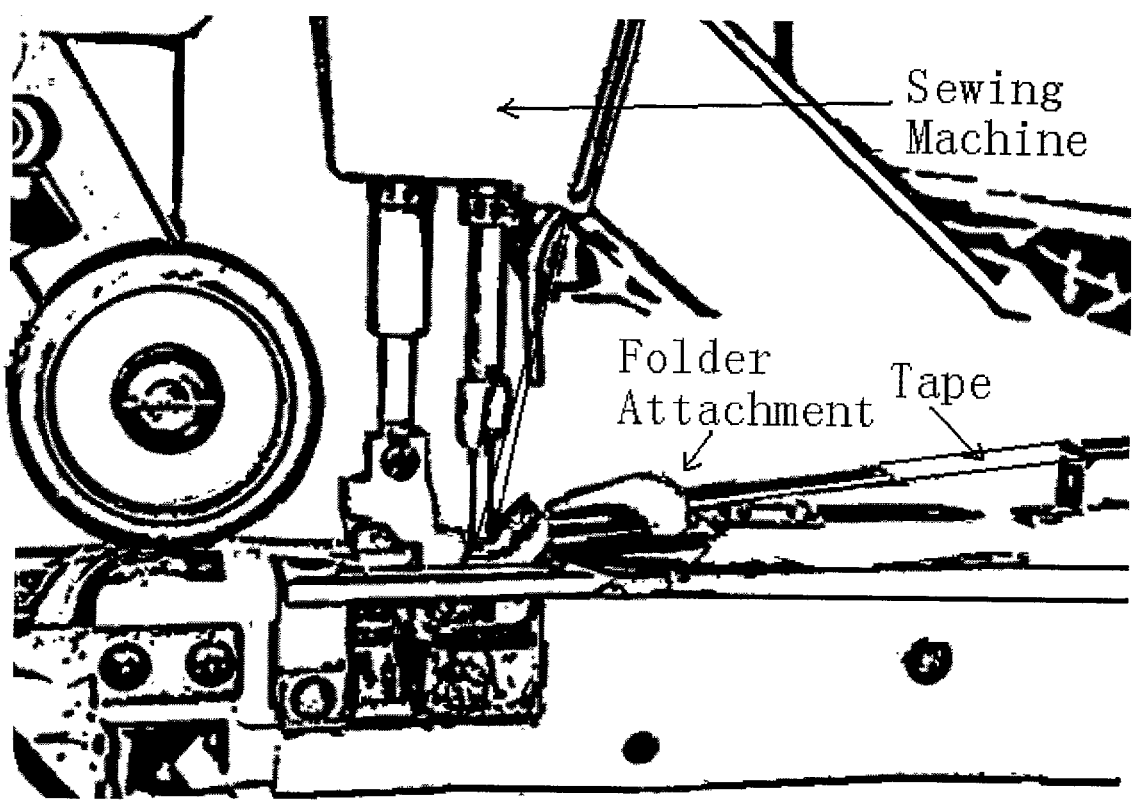

FIGS. 22A–22B illustrate how an attachment folder is used in one embodiment of the invention. Specifically, the attachment folder as shown in FIGS. 22A and 22B is used to make the seam of FIG. 2C. The attachment folder comprises a bonding element feeder, a first garment component guide, and a second garment component guide. Optionally, it may further comprise a third garment component guide. The bonding element feeder and the garment component guides converge to a common area in where a desired seam is formed. The seam is then stitched by a sewing machine. FIGS. 23A–23E further illustrate how an attachment folder is installed on a sewing machine to facilitate the formation of a desired seam. FIG. 23A is a perspective view of the attachment folder on a sewing machine. FIG. 23B is a side view of the attachment folder on the sewing machine with a bonding element being fed into the attachment folder. FIG. 23C is a side view of the attachment folder on the sewing machine from a different angle. FIG. 23D is a closed-up view of the attachment folder. FIG. 23E is still another side view of the attachment folder on the sewing machine. It should be understood that the structure of an attachment folder varies, depending on the structure of the desired seam. One function of the attachment folder is to automate the process of making seams. Another function is to reduce the number of steps to make a seam. Because an operator only needs to feed the garment components and the bonding element into the attachment folder, more consistent seams are produced.

Although several embodiments of seams have been described and exemplified, it should be understood that the bonding elements described herein may be used to construct any seam, such as those described in U.S. Pat. Nos. 3,399, 642; 5,003,9002; 5,568,779; 5,590,615; 5,713,292; 5,775, 394; 5,782,191; 5,950,554; 6,070,542; and 6,079,343, all of which are hereby incorporated by reference in their entirety. The seams may also be those described in ASTM D6193-97—Standard Practice for Stitches and Seams. Moreover, the seams described in the British Standard for Stitches and Seams may also be made by incorporating the bonding element described herein. Such standards are also incorporated by reference herein in their entirety.

As described above, embodiments of the invention provide various methods for making wrinkle free garments. The methods are relatively simple to implement and generally does not require significant modification of an existing apparatus. No harmful substance is involved during the ironing and pressing processes. Because adhesive materials with the desired properties are used, a relatively stronger bond between the bonding element and at least one garment component is obtained. The stronger bond helps reduce seam puckering. Increased productivity and more consistent seams are obtained when an attachment folder is used to make a seam in one single step. Garments incorporating the seams made in accordance to embodiments of the invention experience reduced or no wrinkle after repeated wearing and/or laundering. Therefore, more aesthetically pleasing garments are provided.

While the invention has been described with reference to a limited number of embodiments, variations and modifications therefrom exist. For example, the garment components can be folded and stitched in a variety of ways or not folded at all. Also, some seams may not require the use of a bonding element. Although the relationship between two components are described herein as "adjacent to" or "abut," both terms mean either direct contact or indirect contact. Some embodiments have direct contact between two components, while other embodiments utilize indirect contact between two components. Still other embodiments have a combination of both. While hot-pressing is a preferred method of applying heat and/or pressure, it should be understood that some adhesive can be cured or hardened to form a relatively strong bond by UV, IR radiation and other form of energy. When a bonding element is adjacent to or abuts a garment component, it should be understood that the bonding element may bond directly or indirectly to the garment component after the application of heat and/or pressure. It is noted that the methods for manufacturing seams are described with reference to a number of steps. These steps can be practiced in any sequence. One or more steps may be omitted or combined but still achieve substantially the same results. Most embodiments are described with respect to a first garment component and a second garment component. The two garment components may refer to two different parts of a single garment component. The appended claims intend to cover all such variations and modifications as falling within the scope of the invention.

What is claimed is:

1. A method for producing a wrinkle free seam in a garment, comprising:
    a) placing a bonding element comprising an adhesive material between two garment components; the adhesive material having a hot pressing melting point greater than 160° C.;
    b) sewing a set of stitches traversing through the bonding element and at least one garment component such that at least one seam is formed;
    c) providing sufficient heat and pressure to effect the bonding of the bonding element to at least one garment component,
        wherein the adhesive material has a peel strength of equal to or greater than 0.5 pounds per inch, and
        wherein providing sufficient heat and pressure comprises pressing the seam at a pressure of at least 2.5 kilograms per square centimeter and a temperature of greater than 160° C. for about 5 to 30 seconds.

2. The method of claim 1, whereby one or more of the garment components are folded to make a seam selected from the group consisting of hem button stay seam, hem bottom seam, pocket seam, sleeve seam, sleeve placket slit seam, yoke seam, shoulder seam, side seam, armhole seam, single needle side seam, double needle side seam, and collar seam.

3. The method of claim 2, wherein an attachment folder is used to place the bonding element between the garment components and to fold the garment components.

4. The method of claim 2, wherein the bonding element is folded over an edge of one of the garment components to form a U-shape in cross-section.

5. The method of claim 2, wherein the bonding element comprises an interlining having the adhesive material on one surface of the interlining.

6. The method of claim 4, wherein the bonding element comprises an interlining having the adhesive material on an outer surface of the folded bonding element.

7. The method of claim 2, wherein the bonding element comprises an interlining having the adhesive material on both surfaces of the interlining.

8. The method of claim 2, wherein the bonding element consists of a solid thermal adhesive film.

9. A garment seam, comprising:
    a) first and second garment components;
    b) a bonding element between the first and second garment components,
    c) at least one set of stitches traversing through the bonding element and at least one of the garment components to form a seam,
        i) wherein the bonding element comprises an interlining having an adhesive material on one surface of the interlining that is directly bonded to the first garment component, the adhesive material having a hot pressing melting point of greater than 160° C. at a pressure of 2.5 kilograms per square centimeter and a peel strength of equal to or greater than about 0.5 pounds per inch.

10. The garment seam of claim 9, wherein the seam is selected from the group consisting of hem button stay seam, hem bottom seam, pocket seam, sleeve seam, sleeve placket slit seam, yoke seam, shoulder seam, side seam, armhole seam, single needle side seam, double needle side seam, cuff seam and collar seam.

11. The seam of claim 10, wherein the bonding element is folded over an edge of the first garment component to form a U-shape in cross-section.

12. A pocket seam comprising:
  a) a first garment component having an upper surface and a lower surface and two substantially parallel side edges and a bottom edge forming a pocket of a shirt;
  b) a bonding element comprising an interlining with upper and lower surfaces, and an adhesive material on the upper surface having a hot pressing melting point greater than 160° C.;
  c) a second garment component having an upper surface and a lower surface;
    wherein the upper surface of the bonding element contacts the lower surface of the first garment component along the side edges and bottom edge of the first garment component, and the first garment component is folded such that the side edges and bottom edge of the first garment component fold over the bonding element such that the lower surface of the first garment component is adjacent to the lower surface of the bonding element,
    wherein the upper surface of the second garment component is adjacent to the folded over upper surface of the first garment component; and
  d) stitches pass through the first garment component, the bonding element, the first garment component and the second garment component,
    wherein the bonding element is directly bonded to the first garment component.

13. A garment seam comprising:
  a) a bonding element comprising an interlining having an upper surface and a lower surface and an adhesive material on the upper surface having a hot pressing melting point greater than 160° C.;
  b) a first garment component having an upper surface directly adjacent to the lower surface of the bonding element;
  c) a second garment component having an upper surface directly adjacent to the lower surface of the first garment component,
    wherein the first garment component is U-folded around the bonding element, further U-folded upon itself, and U-folded again so that the lower surface of the first garment component is directly adjacent to the lower surface of the second garment component; and
  d) stitches through the first garment component, the bonding element, the first garment component, the second garment component, the first garment component, and the first garment component,
    wherein the bonding element is directly bonded to the first garment component.

14. A sleeve seam comprising:
  a) first and second garment components, each having an edge;
  b) first and second bonding elements; wherein
    i) the first and second bonding elements are U-folded around the edge of the first and second garment components;
    ii) stitches pass through the first bonding element, the first garment component, and the first bonding element, and stitches pass through the second bonding element, the second garment component, and the second bonding element,
    iii) the second garment component is further folded against itself
    iv) stitches pass through the second bonding element, the second garment component, the second bonding element, and the second garment component;
    v) first and second garment components are adjacent to each other such that U-shaped first and second bonding elements abut;
    vi) stitches pass through the first bonding element, the first garment component, the first bonding element, and the second garment component;
    vii) the first garment component is folded back such that the first garment component abuts the second bonding element; and
    viii) stitches pass through the first garment component, second bonding element, the second garment component, the second bonding element, and the second garment component,
      wherein the first and second bonding elements are directly bonded to both the first and second garment components.

15. The sleeve seam of claim 14, wherein said first bonding element comprises a adhesive on at least one of said inner and outer surfaces.

16. The sleeve seam of claim 14, wherein said first bonding element comprises a thermal polymer tape.

17. A double stitch side seam comprising:
  a) a first garment component having an upper surface;
  b) a second garment component having an edge and upper and lower surfaces;
  c) a U-folded bonding element having an inner and an outer surface; wherein
    i) the U-folded bonding element is around the edge of the second garment component such that the inner surface of the bonding element abuts the upper and lower surfaces of the second garment component;
    ii) stitches pass through the bonding element, the second garment component, and the bonding element,
    iii) the lower surface of the first garment component abuts the upper surface of the second garment component;
    iv) the second garment component is folded back so that the outer surface of the bonding element abuts the upper surface of the first garment component;
    v) the first garment component is folded back against the bonding element such that the upper surface of the first garment component abuts the outer surface of the bonding element;
    vi) two sets of stitches pass through the first garment component, the bonding element, the second garment component, the bonding element, the first garment component, and the second garment component,
      wherein bonding element is directly bonded to both the first and second garment components.

18. The double stitch seam of claim 17, wherein said bonding element comprises an adhesive on at least one of said inner and outer surfaces.

19. The double stitch seam of claim 17, wherein said bonding element comprises a thermal polymer tape.

20. A single stitch side seam comprising:
a) a first garment component having an upper surface;
b) a second garment component having an edge and upper and lower surfaces;
c) a U-folded bonding element having an inner and an outer surface; wherein
   i) the U-folded bonding element is around the edge of the second garment component such that the inner surface of the bonding element abuts the upper and lower surfaces of the second garment component;
   ii) stitches pass through the bonding element, the second garment component, and the bonding element,
   iii) the lower surface of the first garment component abuts the upper surface of the second garment component;
   iv) the second garment component is folded back so that the outer surface of the bonding element abuts the upper surface of the first garment component;
   v) stitches pass through the bonding element, the second garment component, the bonding element, the first garment component, the second garment component;
   vi) the first garment component is folded back against the bonding element such that the upper surface of the first garment component abuts the outer surface of the bonding element;
   vii) stitches pass through the first garment component, the bonding element, the second garment component, the bonding element, the first garment component, and the second garment component,
   wherein bonding element is directly bonded to both the first and second garment components.

21. The single stitch side seam of claim 20, wherein said bonding element comprises an adhesive on at least one of said inner and outer surfaces.

22. The single stitch side seam of claim 20, wherein said bonding element comprises a thermal polymer tape.

* * * * *